US012287593B2

(12) United States Patent
An et al.

(10) Patent No.: US 12,287,593 B2
(45) Date of Patent: Apr. 29, 2025

(54) IMAGE FORMING APPARATUS WHICH SUPPLIES YELLOW TONER AS PROTECTIVE AGENT TO SECONDARY TRANSFER MEMBER

(71) Applicant: CANON KABUSHIKI KAISHA, Tokyo (JP)

(72) Inventors: Koji An, Saitama (JP); Keisuke Ishizumi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/330,979

(22) Filed: Jun. 7, 2023

(65) Prior Publication Data

US 2023/0418188 A1 Dec. 28, 2023

(51) Int. Cl.

*G03G 15/16* (2006.01)
*G03G 15/00* (2006.01)
*G03G 15/01* (2006.01)

(52) U.S. Cl.

CPC ....... *G03G 15/161* (2013.01); *G03G 15/0131* (2013.01); *G03G 15/1615* (2013.01); *G03G 15/168* (2013.01); *G03G 15/5058* (2013.01); *G03G 2215/1623* (2013.01)

(58) Field of Classification Search

CPC ............. G03G 15/0131; G03G 15/161; G03G 15/1615; G03G 15/168; G03G 15/5058; G03G 2215/1623

See application file for complete search history.

(56) References Cited

U.S. PATENT DOCUMENTS

| | | | | |
|---|---|---|---|---|
| 8,095,032 | B2 | 1/2012 | Torimaru et al. | |
| 8,204,394 | B2 | 6/2012 | Nakayama | |
| 8,934,822 | B2 | 1/2015 | Mimbu et al. | |
| 9,075,349 | B2 | 7/2015 | Komatsuzaki et al. | |
| 9,488,937 | B2 | 11/2016 | Tanaka et al. | |
| 10,866,543 | B2 | 12/2020 | Hamana et al. | |
| 2009/0117477 | A1 * | 5/2009 | Magome .............. | G03G 9/0836 430/48 |

(Continued)

FOREIGN PATENT DOCUMENTS

| | | | |
|---|---|---|---|
| JP | 2005-258247 | A | 9/2005 |
| JP | 2009-058732 | A | 3/2009 |
| JP | 2009-180868 | A | 8/2009 |

(Continued)

OTHER PUBLICATIONS

Office Action dated Feb. 20, 2024, in Japanese Patent Application No. 2022-093285.

*Primary Examiner* — Joseph S Wong
(74) *Attorney, Agent, or Firm* — Venable LLP

(57) ABSTRACT

An image forming apparatus includes an image bearing member, a transfer member, a supplying member for supplying a protective agent applied onto a surface of the transfer member, and a controller capable of controlling the supplying member. In a state in which the transfer member contacts the image bearing member during non-image formation outside of image formation in which the toner image is transferred from the image bearing member onto the recording material, the controller carries out control so that an operation in an application mode, in which the protective agent supplied from the supplying member is applied onto the surface of the transfer member, is executed.

22 Claims, 15 Drawing Sheets

(56) References Cited

U.S. PATENT DOCUMENTS

2018/0143570 A1* 5/2018 Mizutani .............. G03G 15/161

FOREIGN PATENT DOCUMENTS

| | | | |
|---|---|---|---|
| JP | 2010-072327 | A | 4/2010 |
| JP | 2012-247535 | A | 12/2012 |
| JP | 2013-109072 | A | 6/2013 |
| JP | 2013-164578 | A | 8/2013 |
| JP | 2013-178451 | A | 9/2013 |
| JP | 2015-004816 | A | 1/2015 |
| JP | 2016-177062 | A | 10/2016 |
| JP | 2020-190720 | A | 11/2020 |
| JP | 2021-006839 | A | 1/2021 |

* cited by examiner

IMAGE FORMING APPARATUS WHICH SUPPLIES YELLOW TONER AS PROTECTIVE AGENT TO SECONDARY TRANSFER MEMBER

FIELD OF THE INVENTION AND RELATED ART

The present invention relates to an image forming apparatus, such as a printer, a copying machine, a facsimile machine, or a multi-function machine, of an electrophotographic type or an electrostatic recording type.

In the image forming apparatus of the electrophotographic type, a toner image formed on an image bearing member is transferred onto a recording material. The transfer of the toner image from the image bearing member onto the recording material is carried out in many cases by applying a transfer voltage to a transfer member such as a transfer roller forming a transfer portion (transfer nip) in contact with the image bearing member. In an image forming apparatus of an intermediary transfer type, a toner image formed on a photosensitive member or the like as a first image bearing member is primary-transferred onto an intermediary transfer member as a second image bearing member, and the toner image is secondary-transferred from the intermediary transfer member onto the recording material. As the intermediary transfer member, an intermediary transfer belt constituted by an endless belt has been widely used. Further, the secondary transfer is carried out in many cases by applying a voltage to a secondary transfer member such as a secondary transfer roller which is disposed opposed to one of stretching rollers for stretching the intermediary transfer belt and which forms a secondary transfer portion (secondary transfer nip) in contact with the intermediary transfer belt. In the following, the image forming apparatus of the intermediary transfer type including the intermediary transfer belt will be principally described as an example.

In the image forming apparatus as described above, contamination of the secondary transfer roller with toner occurs in some instances. For example, in the image forming apparatus calibration for adjusting density (image quality) and color misregistration due to a change in environmental condition such as a temperature and a humidity is performed. The calibration is executed every predetermined number of sheets subjected to image formation or the case where a change in predetermined environmental condition is caused, in order to meet, a change image quality due to a change in charging characteristic of the photosensitive member, or the like. In the calibration, a plurality of test toner images (hereinafter, also referred to as "toner patches") are formed in an array shape along a movement direction of a surface of the intermediary transfer belt. For example, toner patches for density adjustment changed stepwise in density for toner of each of colors, or toner patches for color misregistration adjustment formed with toners of the colors are formed on the intermediary transfer belt in a single array or a plurality of arrays. Then, a density or a color misregistration amount of this toner patch on the intermediary transfer belt is detected by a toner detection sensor constituted by a photo-sensor, and on the basis of a detection result, the density (image quality) or the color misregistration is adjusted. Such a toner patch is deposited on the secondary transfer roller, so that the contamination of the secondary transfer roller with the toner occurs in some instances.

In Japanese Laid-Open Patent Application No. 2013-109072, a technique for suppressing the contamination of the secondary transfer roller with the toner patch is disclosed. That is, when the toner patch passes through the secondary transfer portion, a voltage of the same polarity as a normal charge polarity of the toner is applied to the secondary transfer roller. By this, by an electric repulsive force between a surface potential of the secondary transfer roller and an electric charge of the toner, electrostatic deposition of the toner on the secondary transfer roller is suppressed.

However, in a conventional constitution, the contamination of the secondary transfer roller with the toner cannot be sufficiently suppressed in some cases.

For example, even when the voltage of the same polarity as the normal charge polarity of the toner, in the case where a physical depositing force between the surface of the secondary transfer roller and the toner is larger than the electric repulsive force, the contamination of the secondary transfer roller with the toner patch occurs in some instances.

Particularly, in the case where the secondary transfer roller is in a new article state or in a state close to the new article state and the case where the depositing force between the surface of the secondary transfer roller and the toner exist, the contamination of the secondary transfer roller with the toner patch is liable to occur.

Incidentally, contamination of the secondary transfer roller with fog toner deposited on a non-image portion is also similar to the above-described case, and particularly in the case where the secondary transfer roller is in the new article state or the state close to the new article state, the contamination of the secondary transfer roller with the fog toner is liable to occur in some instances.

When the secondary transfer roller is contaminated with the toner, the following phenomenon occurs in some cases. That is, by an impact when the recording material enters the secondary transfer portion during the image formation and when the recording material comes out of the secondary transfer portion during the image formation, a phenomenon such that the recording material is contaminated by deposition of the toner, deposited on the secondary transfer roller, on a leading end (edge) or a tailing end (edge) of the recording material (hereinafter, this phenomenon is referred to as "paper edge contamination") occurs in some cases.

SUMMARY OF THE INVENTION

A principal object of the present invention is to suppress contamination, with toner, of a transfer member forming a transfer portion where the transfer member contacts an image bearing member and thus a toner image is transferred from the image bearing member onto a recording material.

This object has been accomplished by an image forming apparatus according to the present invention.

According to an aspect of the present invention, there is provided an image forming apparatus comprising an image bearing member configured to bear a toner image formed with toner charged to a normal polarity; a transfer member configured to form a transfer portion where the toner image is transferred from the image bearing member onto a recording material in contact with a surface of the image bearing member; a transfer voltage applying portion configured to apply a transfer voltage having the same polarity as the normal polarity of the toner to the transfer portion; a supplying member configured to supply a protective agent to be applied onto a surface of the transfer member; and a controller capable of controlling the transfer voltage applying portion and the supplying member, wherein the controller controls an image forming operation in which the toner image is transferred from the image bearing member onto the recording material, an application mode in which the protective agent supplied from the supplying member is applied onto the surface of the transfer member in a state in which the transfer member contacts the image bearing member during a non-image forming operation other than during the image forming operation, and a cleaning mode in which the surface of the transfer member is cleaned in a state in which the transfer member contacts the image bearing member during a non-image forming operation, and wherein, in the application mode and the cleaning mode, the controller controls the transfer voltage applying portion to apply the transfer voltage having the same polarity as the normal polarity, and controls an absolute value of the transfer voltage applied in the application mode to be lower than the absolute value of the transfer voltage applied in the cleaning mode.

Further features of the present invention will become apparent from the following description of exemplary embodiments with reference to the attached drawings.

Figure 3:
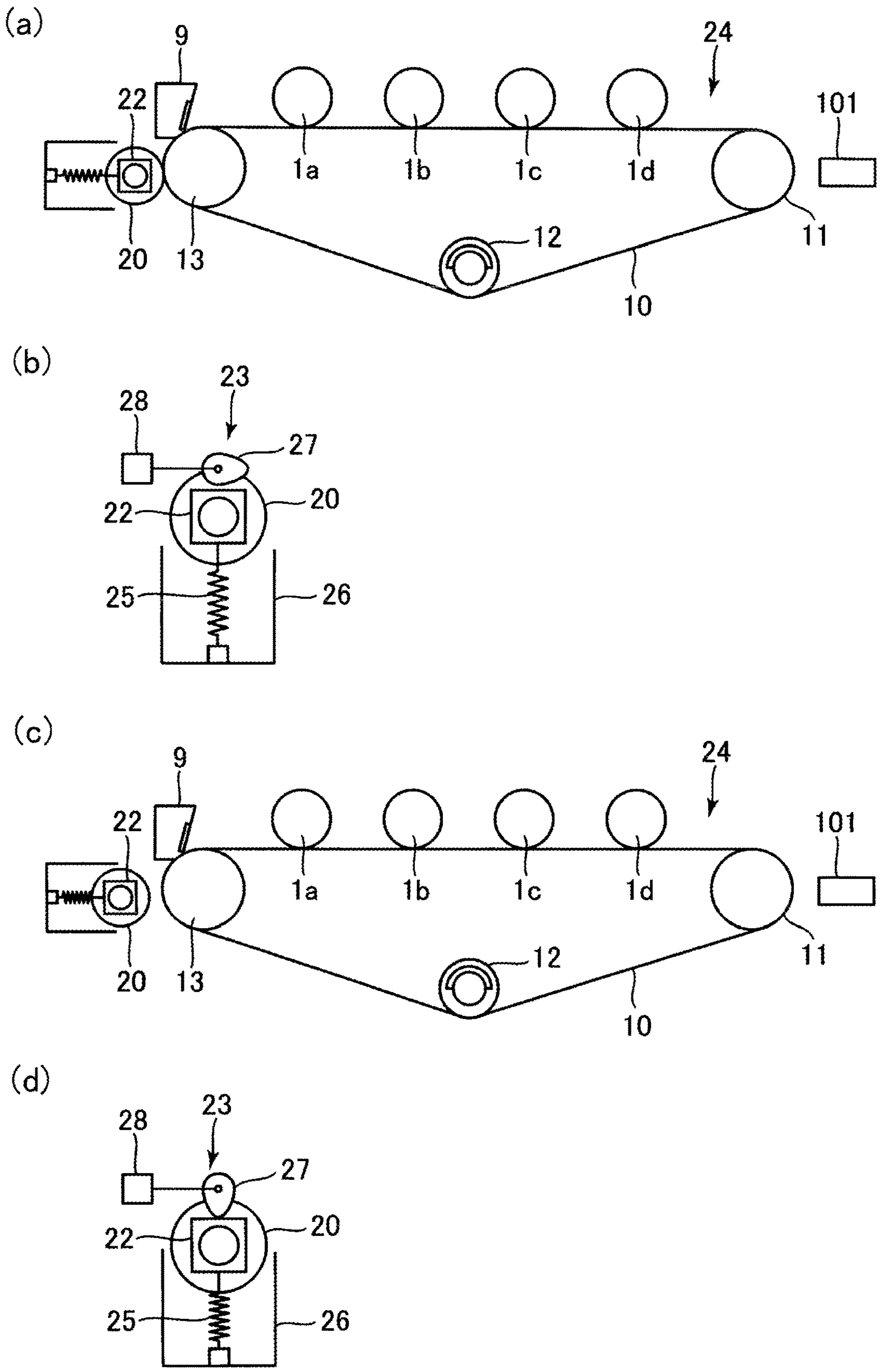

Parts (a) to (d) of FIG. 3 are schematic views for illustrating a contact/separation state of a secondary transfer roller.

Figure 4:
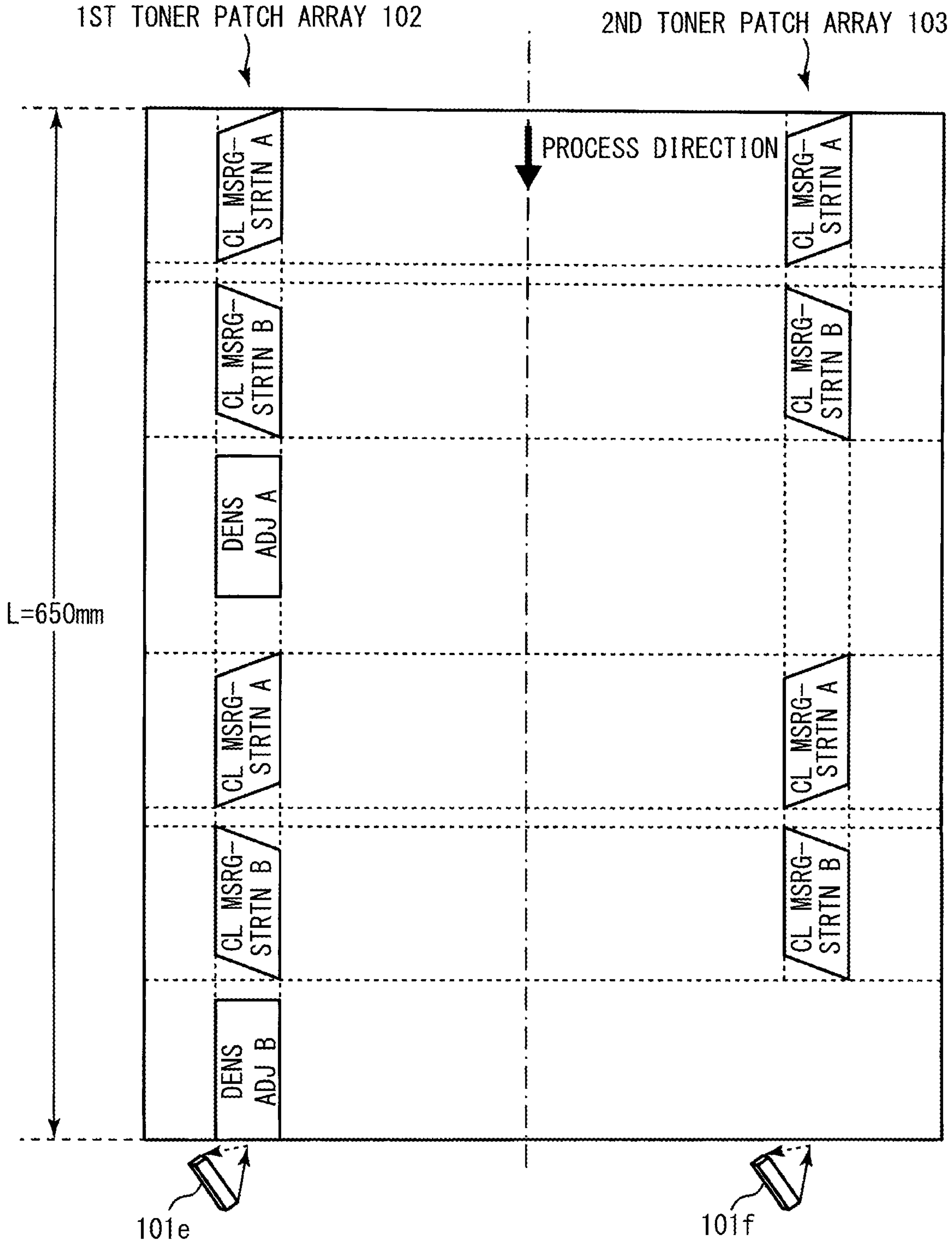

FIG. 4 is a schematic view for illustrating a toner patch for calibration.

Figure 5:
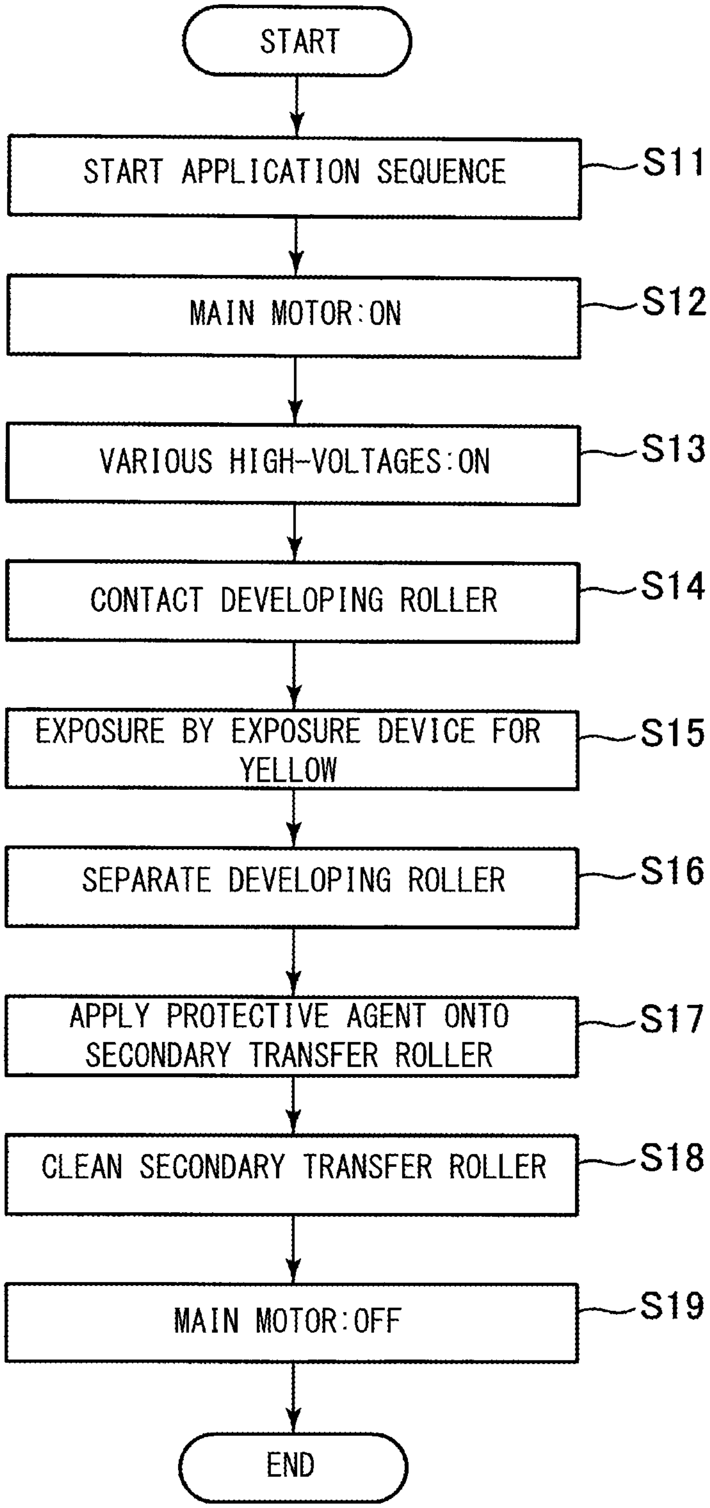

FIG. 5 is a flowchart of an application sequence.

Figure 6:
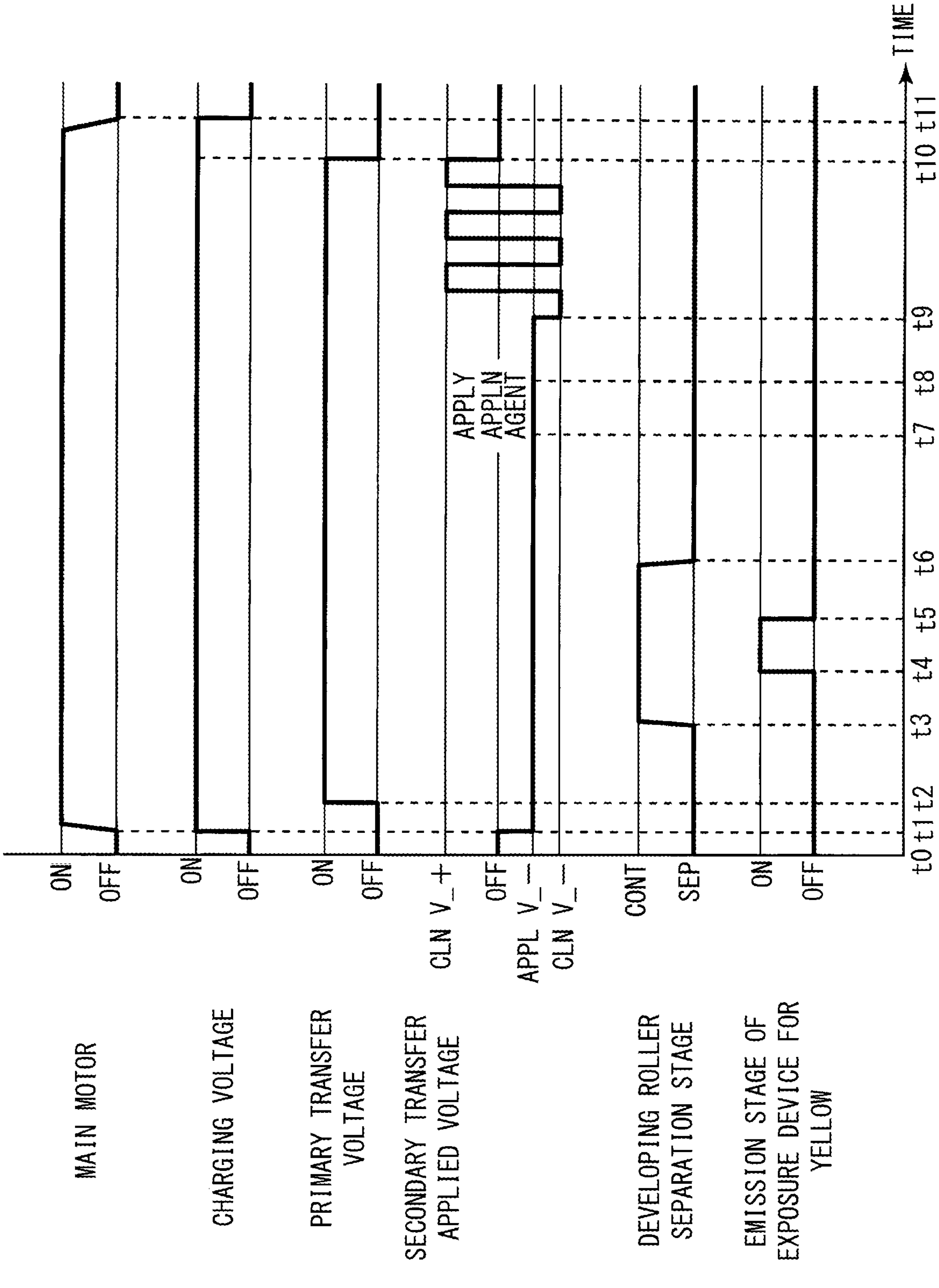

FIG. 6 is a timing chart of the application sequence.

Figure 7:
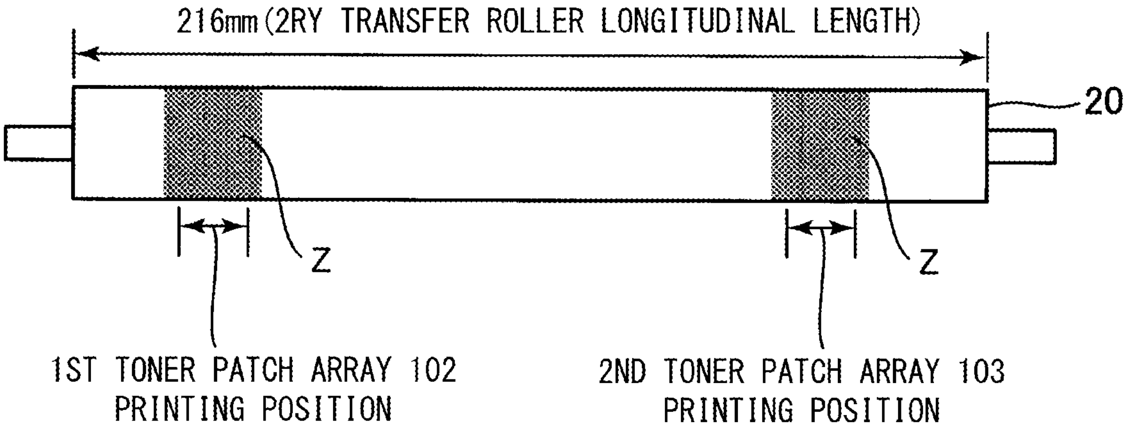

FIG. 7 is a schematic side view of the secondary transfer roller onto which a protective agent is applied.

Figure 8:
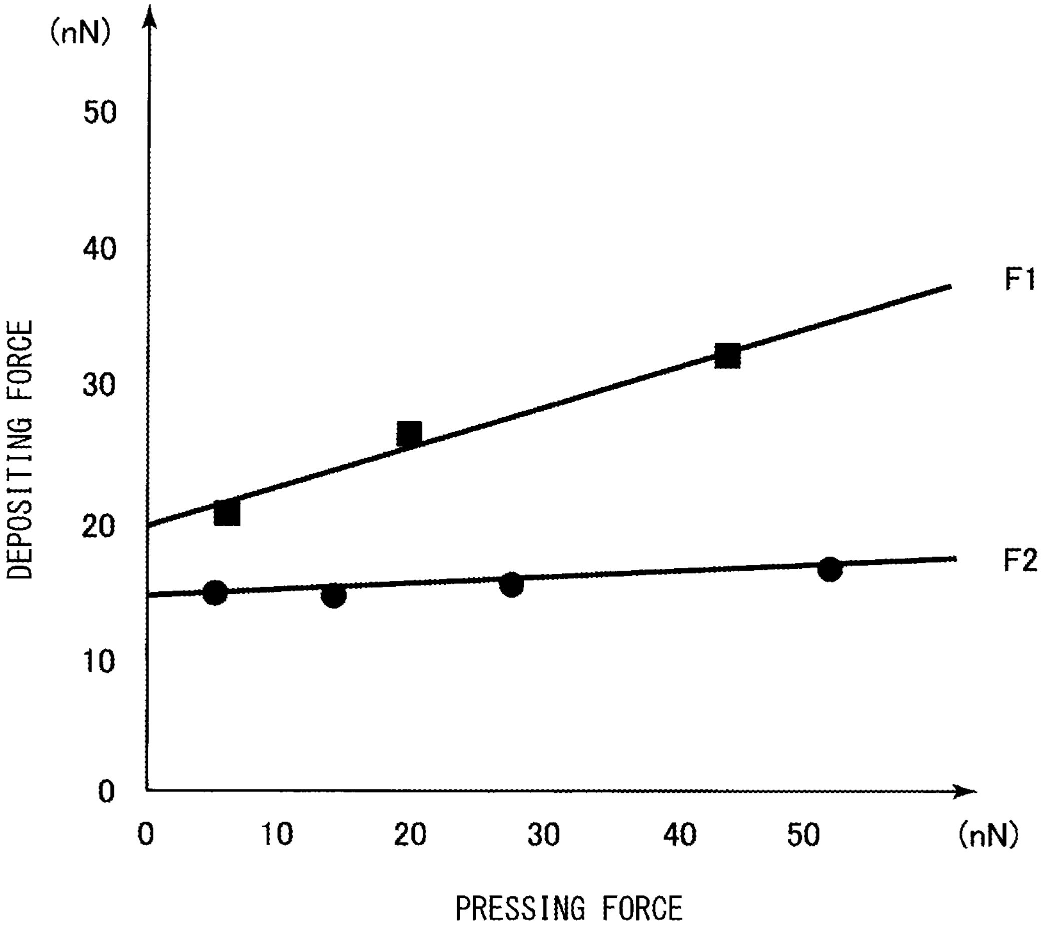

FIG. 8 is a graph for illustrating a depositing force of the protective agent.

Figure 9:
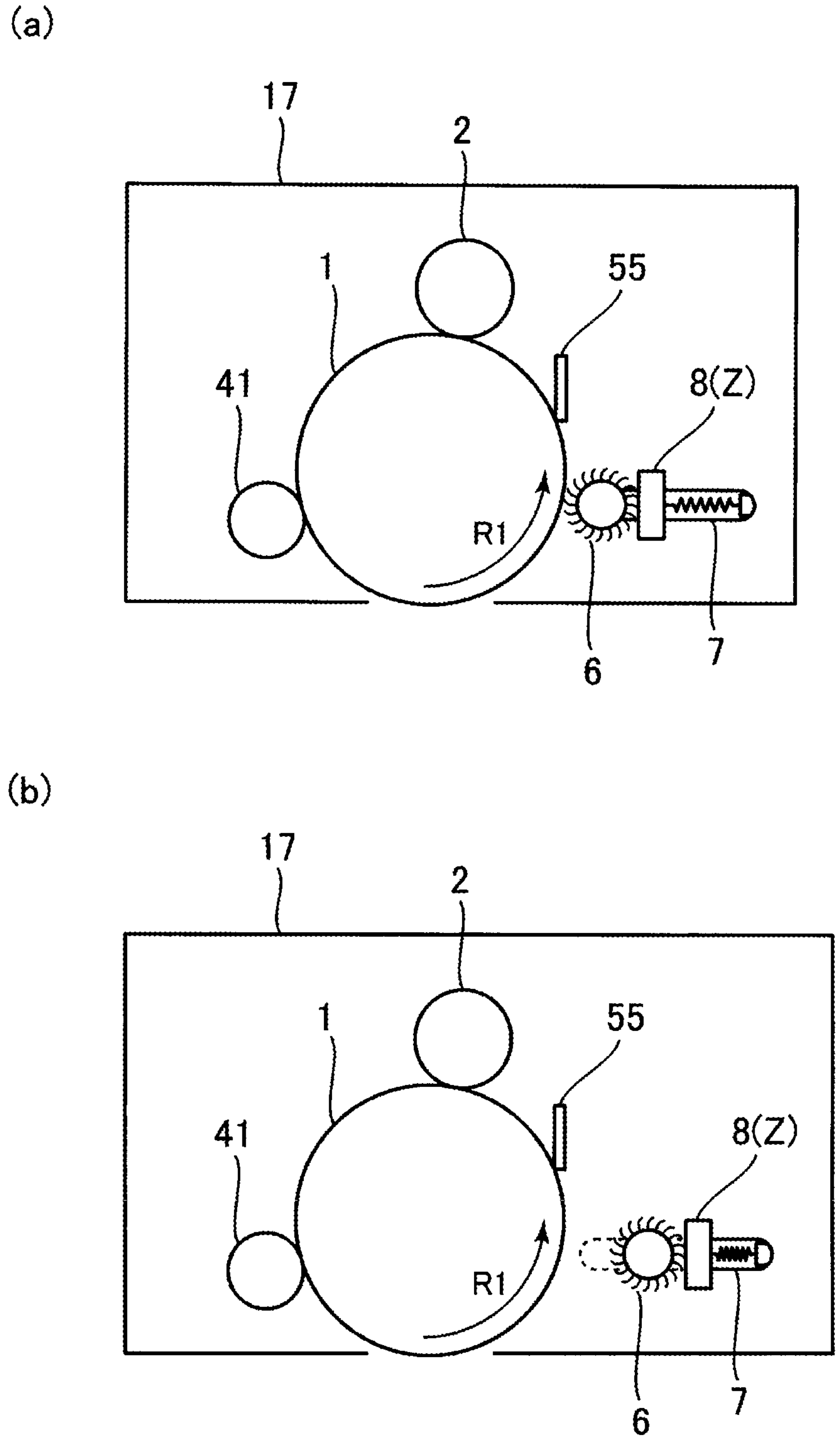

Parts (a) and (b) of FIG. 9 are schematic views for illustrating an example of an application device.

Figure 10:
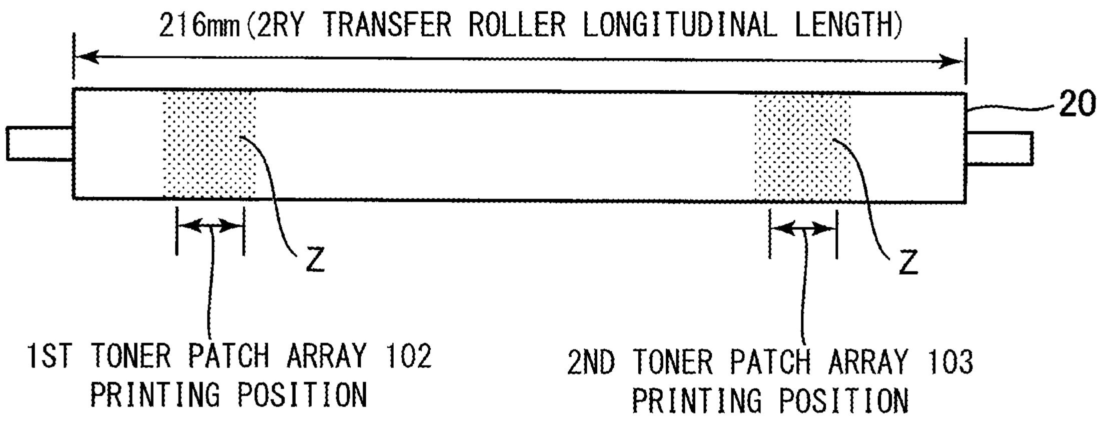

FIG. 10 is a schematic side view of a secondary transfer roller onto which a protective agent is applied in another embodiment.

Figure 11:
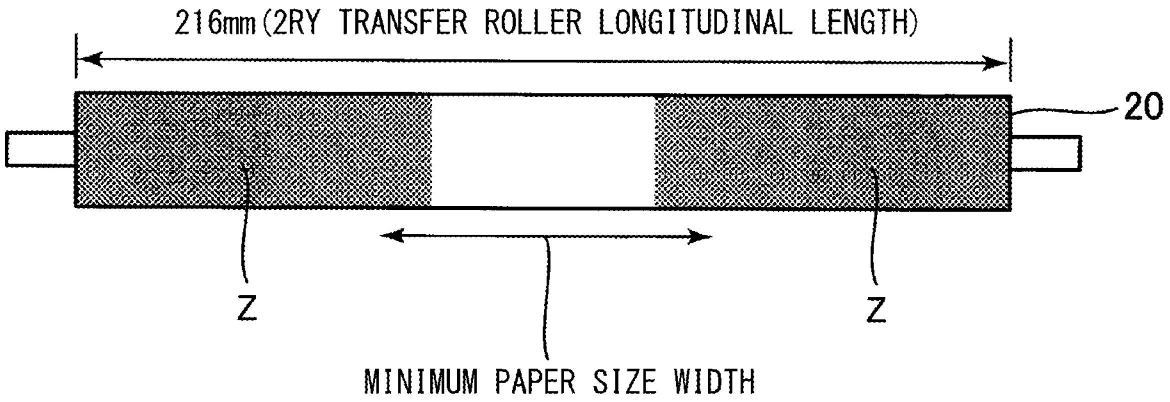

FIG. 11 is a schematic side view of a secondary transfer roller onto which a protective agent is applied in another embodiment.

Figure 12:
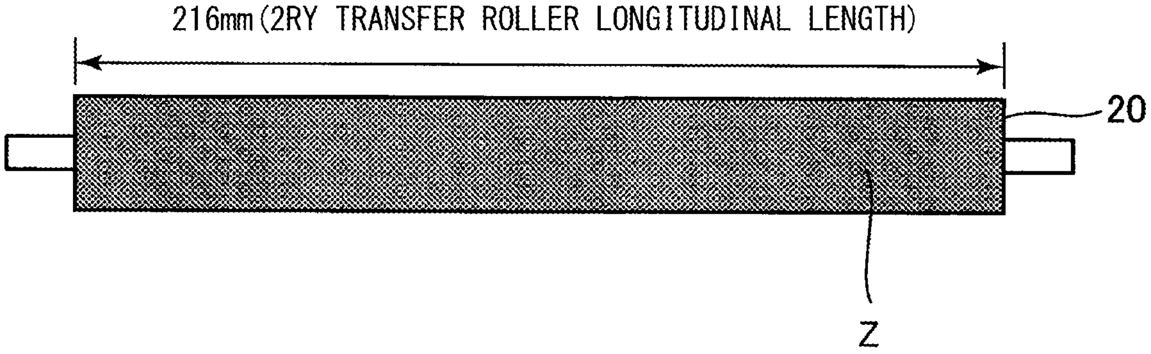

FIG. 12 is a schematic side view of a secondary transfer roller onto which a protective agent is applied in another embodiment.

Figure 13:
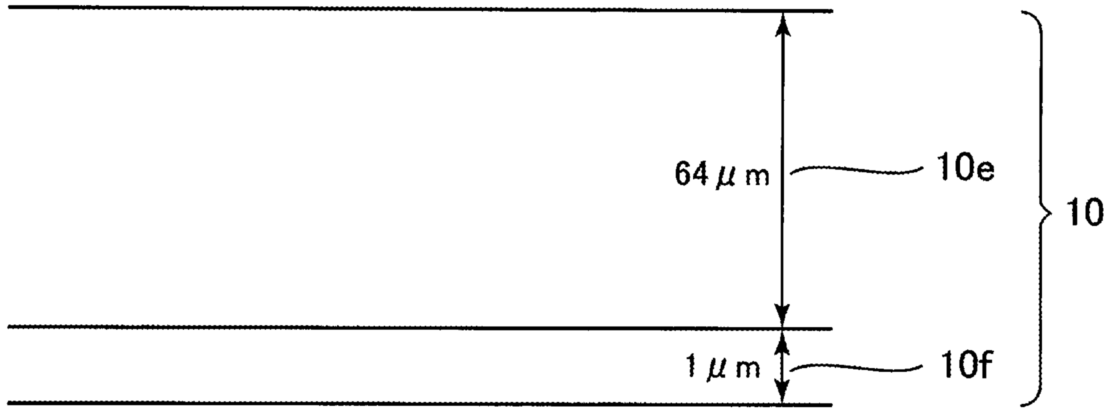

FIG. 13 is a schematic sectional view of an intermediary transfer belt in another embodiment.

Figure 14:
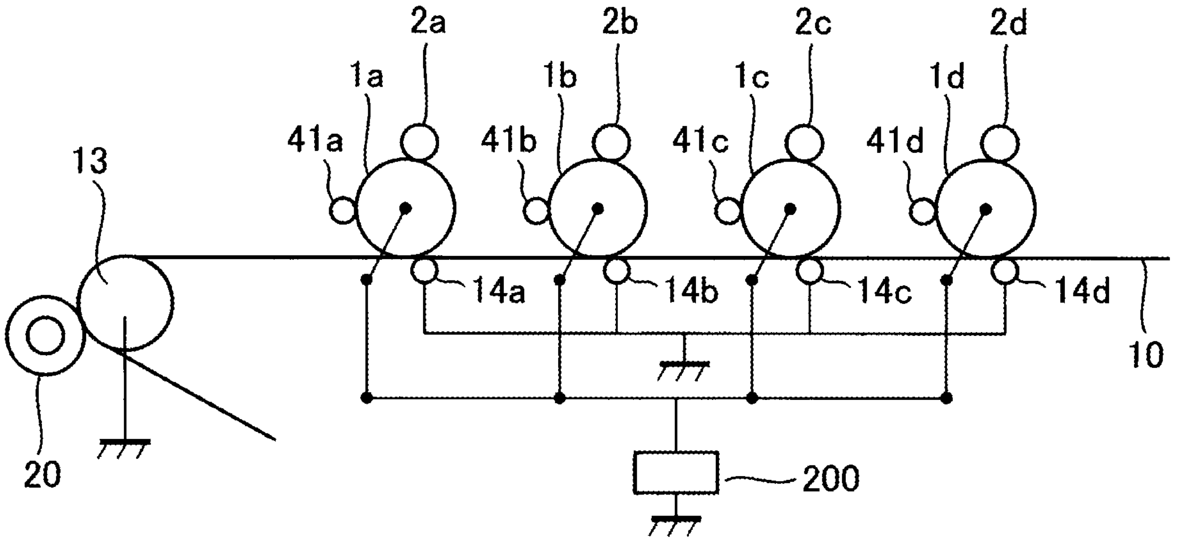

FIG. 14 is a schematic sectional view of an image forming apparatus of another embodiment.

Figure 15:
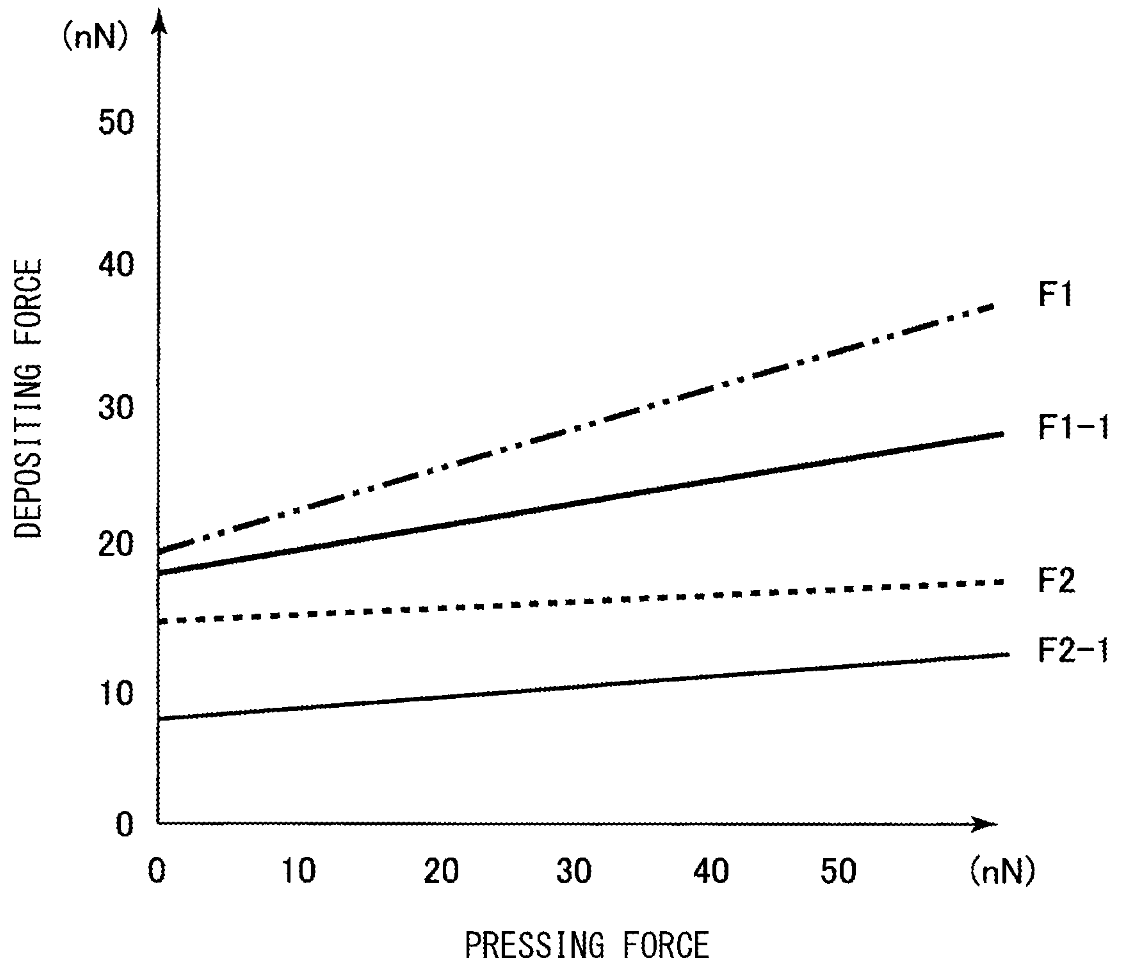

FIG. 15 is a graph for illustrating a depositing force of a protective agent in another embodiment.

DESCRIPTION OF THE EMBODIMENTS

In the following, an image forming apparatus according to the present invention will be described specifically with reference to the drawings.

Embodiment 1

1. Overall Structure and Operation of Image Forming Apparatus

Figure 1:
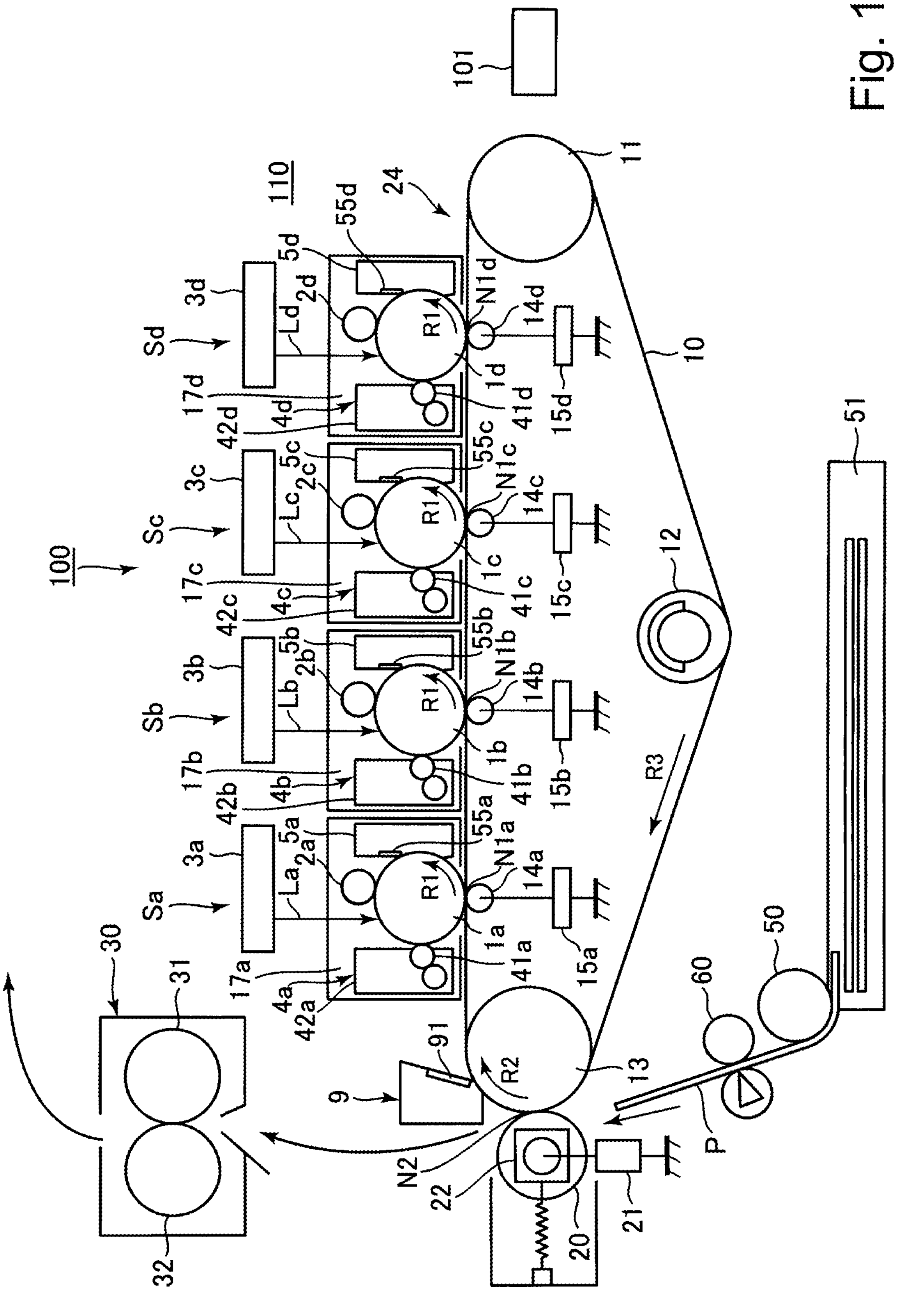
FIG. 1 is a schematic sectional view of an image forming apparatus.

FIG. 1 is a schematic sectional view of an image forming apparatus 100 of an embodiment 1. The image forming apparatus 100 of this embodiment is a full-color laser beam printer of an in-line type and an intermediary transfer type. The image forming apparatus 100 is capable of forming a full-color image on a recording material P (for example, a recording sheet or a plastic sheet) in accordance with image information. The image information is inputted, to the image forming apparatus 100, from a host computer such as a personal computer communicatably connected to the image forming apparatus 100 or from an image reading apparatus or the like connected to the image forming apparatus 100. Incidentally, the recording material P is referred to as "paper", but the recording material P is not limited to paper.

The image forming apparatus 100 includes, as a plurality of image forming portions (stations), first to fourth image forming portions Sa, Sb, Sc and Sd for forming images of yellow (Y), magenta (M), cyan (C) and black (K), respectively. In this embodiment, the first to fourth image forming portions Sa, Sb, Sc and Sd are disposed in line along a direction crossing a vertical direction. As regards elements having the same or corresponding functions or constitutions in the image forming portions Sa, Sb, Sc and Sd, these elements are collectively described in some instances by omitting suffixes, a, b, c, and d of reference numerals or symbols representing the elements provided for associated colors. In this embodiment, the image forming portion S includes a photosensitive drum 1 (1*a*, 1*b*, 1*c*, 1*d*), a charging roller 2 (2*a*, 2*b*, 2*c*, 2*d*), an exposure device 3 (3*a*, 3*b*, 3*c*, 3*d*), a developing device 4 (4*a*, 4*b*, 4*c*, 4*d*), a drum cleaning device 5 (5*a*, 5*c*, 5*d*), and the like which are described later.

Figure 2:
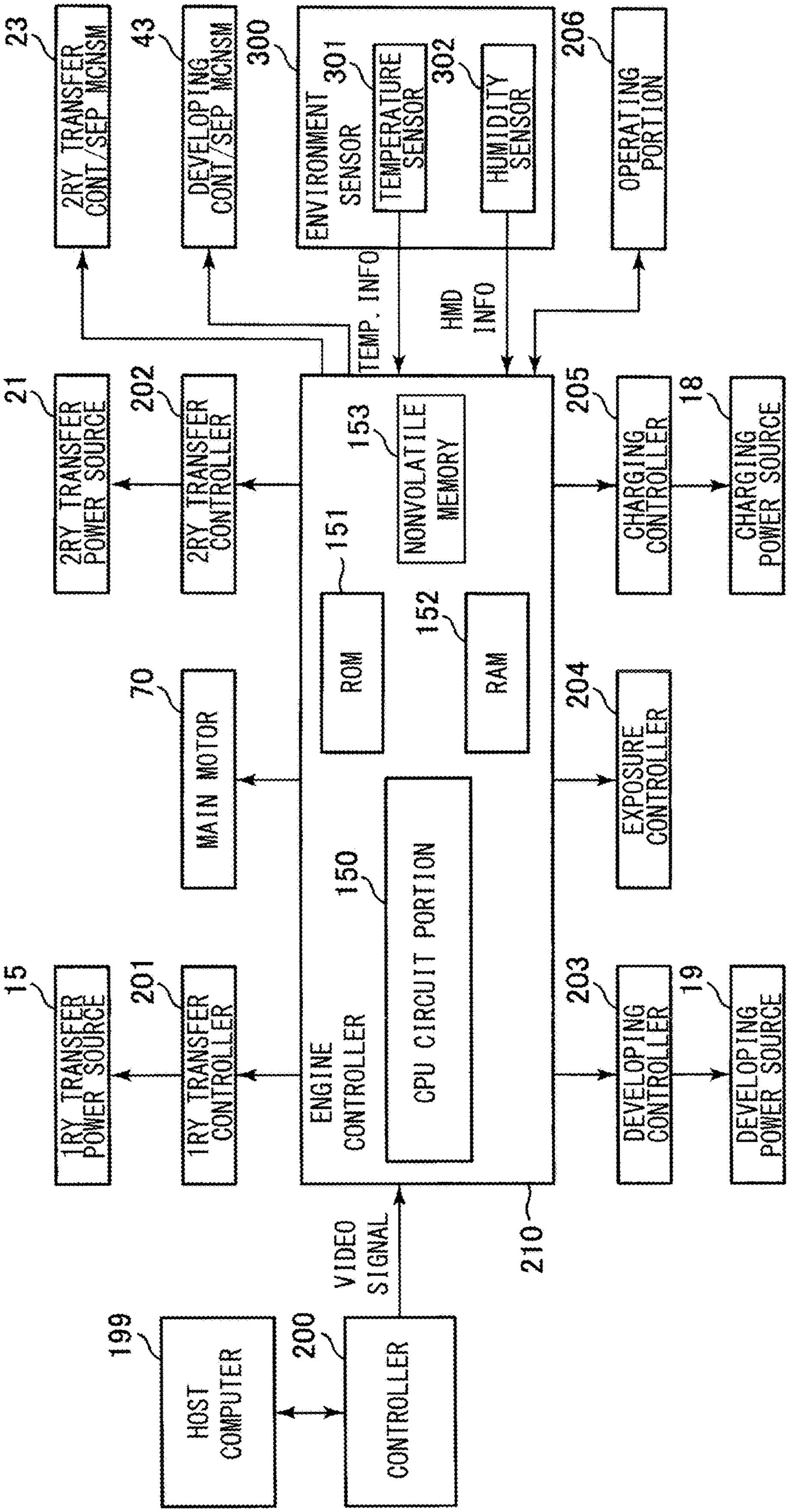
FIG. 2 is a schematic block diagram showing a control mode of the image forming apparatus.

The photosensitive drum 1 which is a rotatable drum type (cylindrical) photosensitive member (electrophotographic photosensitive member) as a first image bearing member is rotationally driven in an arrow R1 direction (counterclockwise direction) in FIG. 1. The photosensitive drum 1 is rotationally driven by a driving force transmitted from a driving motor (main motor 70 (FIG. 2) described later) as a driving source constituting a driving means. A surface of the rotating photosensitive drum 1 is electrically charged uniformly by the charging roller 2, which is a roller type charging member, as a charging means. By this, a non-image portion potential (dark potential, non-image forming potential) Vd is formed on the surface of the photosensitive drum 1. The charging roller 2 is disposed in contact with the photosensitive drum 1 and is rotated with the rotation of the photosensitive drum 1. During a charging step, to the charging roller 2, a predetermined charging voltage (charging bias) is applied from a charging power source (high-voltage power source) 18 (FIG. 2) as a charging voltage applying means (charging voltage applying portion). In this embodiment, during the charging step, a negative-polarity DC voltage is applied as the charging voltage to the charging roller 2. Incidentally, with respect to a rotational direction of the photosensitive drum 1, a position where a charging process of the surface of the photosensitive drum 1 by the charging roller 2 is performed is a charging portion (charging position). In this embodiment, the charging process of the surface of the photosensitive drum 1 is performed by electric discharge generating in at least one of minute gaps between the charging roller 2 and the photosensitive drum 1 formed on sides upstream and downstream of a contact portion between the charging roller 2 and the photosensitive drum 1 with respect to the rotational direction of the photosensitive drum 1. However, the contact portion between the charging roller 2 and the photosensitive drum 1 may be deemed as the charging portion (charging position). The charged surface of the photosensitive drum 1 is subjected to scanning exposure by the exposure device (laser scanner unit) 3, so that an electrostatic latent image (electrostatic image) is formed on the photosensitive drum 1. The uniformly charged surface of the photosensitive drum 1 is exposed to light by the exposure device 3, and an absolute value of a potential of a portion (exposure portion) exposed to light on the surface of the photosensitive drum 1 is lowered, so that an image portion potential (light potential, image forming potential) V1 is formed on the surface of the photosensitive drum 1. The exposure device 3 irradiates the photosensitive drum 1 with laser light L in accordance with an output calculated on the basis of the image information, inputted from, for example, the host computer 199 (FIG. 2) such as a personal computer, by a CPU circuit portion 150 (FIG. 2). The electrostatic latent image formed on the photosensitive drum 1 is developed (visualized) by being supplied with the toner as a developer by the developing device 4 as a developing means, so that a toner image (developer image) is formed on the photosensitive drum 1. The developing device 4 includes a developing container 42 for accommodating the toner and a developing roller 41 as a developer carrying member (developing member) provided rotatably in the developing container 42. In this embodiment, the developing device 4 causes a development (image) contact and separation mechanism 43 (FIG. 2) as a moving means to make the developing roller 41 movable between a contact position where the developing roller 41 contacts the photosensitive drum 1 and a separated position where the developing roller 41 is separated from the photosensitive drum 1. During a developing step, the developing roller 41 is contacted to the photosensitive drum 1. Further, during the developing step, the developing roller 41 is rotationally driven by a driving force transmitted from a driving motor (the main motor 70 (FIG. 2) described later) as a driving source constituting a driving means. Further, during the developing step, to the developing roller 41, a predetermined developing voltage (developing bias) is applied from a developing power source (high-voltage power source) 19 (FIG. 2) as a developing voltage applying means (developing voltage applying portion). In this embodiment, during the developing step, a negative-polarity DC voltage is applied as the developing voltage to the developing roller 41.

The developing voltage is set at a potential between the non-image portion potential and the image portion potential on the photosensitive drum 1. In this embodiment, on an exposure portion (image portion) of the photosensitive drum 1 where the absolute value of the potential is lowered through exposure to light after the uniform charging process, the toner charged to the same polarity (negative in this embodiment) as the charge polarity of the photosensitive drum 1 is deposited (reverse development type). In this embodiment, a normal charge polarity of the toner which is the charge polarity of the toner during the development is the negative polarity.

Here, the development contact and separation mechanism 43 has the following constitution, for example. The developing container 42 is rotatable (swingable) around a rotational axis substantially parallel to a rotational axis direction of the photosensitive drum 1, and the developing roller 41 is urged by an urging member such as a spring so that the developing roller 41 is rotated in a direction in which the developing roller 41 is contacted to the photosensitive drum 1. The development contact and separation mechanism 43 moves the developing container 42 by, for example, a solenoid or a cam mechanism. For example, the development contact and separation mechanism 43 includes a driving portion provided with a driving source such as a motor, and a moving member such as a cam for moving the developing device 4 by being driven by a driving portion.

Further, the development contact and separation mechanism 43 is constituted so that pressing (urging) of the moving member against the developing container 42 and release of the pressing can be carried out. The developing container 42 is pressed by the moving member against an urging force of the above-described urging member, so that the developing roller 41 can be separated from the photosensitive drum 1. Further, by releasing the pressing against the developing container 42 by the moving member, the developing container 42 is moved by the urging force of the urging member, so that the developing roller 41 can be contacted to the photosensitive drum 1. In this embodiment, the development contact and separation mechanism 43 roughly brings the developing roller 41 into contact with the photosensitive drum 1 during the developing step. Further, the development contact and separation mechanism 43 roughly separates the developing roller 41 from the photosensitive drum 1 during a stop of the drive of the image forming apparatus 100 (stand-by state, sleep state, OFF state of the power source) other than during the developing step. Incidentally, in this embodiment, the developing roller 41 is rotationally driven when the developing device 4 is disposed in the contact position, and the drive of the developing roller 41 is stopped when the developing device 4 is disposed in the separated position. Further, in this embodiment, the developing voltage is applied to the developing roller 41 when the developing device 4 is disposed in the contact position, and the application of the developing voltage is stopped when the developing device 4 is disposed in the separated position.

An intermediary transfer belt 10 which is an intermediary transfer member constituted by a rotatable endless belt as a second image bearing member is disposed opposed to the four photosensitive drums. The intermediary transfer belt 10 is contactable to the four photosensitive drums 1. The intermediary transfer belt 10 is extended around, as a plurality of stretching rollers (supporting rollers), first, second and third spring rollers 12, 12, and 13, and is stretched by a predetermined tension. In this embodiment, the third stretching roller 13 also functions as a secondary transfer opposite roller and a driving roller 11. In the following, the third stretching roller 13 is also referred to as the "secondary transfer opposite roller". Further, in this embodiment, the second stretching roller 12 also functions as a tension roller for imparting a predetermined tension to the intermediary transfer belt 10. Further, to the secondary transfer opposite roller 13, drive (driving force) is transmitted from a driving motor (the main motor 70 (FIG. 2) described alter) as a driving source constituting a driving means is transmitted, so that the secondary transfer opposite roller is rotationally driven in an arrow R2 direction (clockwise direction) in FIG. 1. By this, the driving force is transmitted to the intermediary transfer belt 13, so that the intermediary transfer belt 10 is rotated (circulated and moved) in an arrow R3 direction (clockwise direction) in FIG. 1. Incidentally, in this embodiment, a peripheral length of the intermediary transfer belt 10 is about 700 mm. On an inner peripheral surface side of the intermediary transfer belt 10, corresponding to the photosensitive drums 1*a* to 1*d*, the primary transfer rollers 14*a* to

14*d* which are roller type primary transfer members as primary transfer means are provided, respectively. Each primary transfer roller 14 presses the intermediary transfer belt 10 toward the associated photosensitive drum 1 and forms a primary transfer portion (primary transfer nip) N1 where the photosensitive drum 1 and the intermediary transfer belt 10 are in contact with each other. In this embodiment, the primary transfer roller 14 is a cylindrical-shaped metal roller of 6 mm in outer diameter, and nickel-plated SUS is used as a material thereof. The primary transfer roller 14 is disposed in a position where a rotation center position thereof is offset by 8 mm from a rotation center position of the photosensitive drum 1 toward a downstream side with respect to a movement direction of the surface of the intermediary transfer belt 10. By this, the intermediary transfer belt 10 is pressed by the primary transfer roller 14 and is wound around the photosensitive drum 1. The primary transfer roller 14 is disposed in a position where the intermediary transfer belt 10 is raised toward the photosensitive drum 1 side by 1 mm relative to a common contact flat plane of the respective photosensitive drums 1 on the intermediary transfer belt 10 side and presses the intermediary transfer belt 10 by a force of about 200 gf. By this, a winding amount of the intermediary transfer belt 10 around the photosensitive drums 1 can be ensured. Of the plurality of stretching rollers, the stretching rollers other than the secondary transfer opposite roller 13 and the respective primary transfer rollers 14 are rotated with the rotation of the intermediary transfer belt 10.

The toner image formed on the photosensitive drum 1 is transferred (primary-transferred) onto the rotating intermediary transfer belt 10 by the action of the primary transfer roller 14 in the primary transfer portion N1. During a primary transfer step, to the primary transfer roller 14, a primary transfer voltage (primary transfer bias) of a polarity (positive in this embodiment) opposite to the normal charge polarity of the toner is applied by a primary transfer voltage power source (high-voltage power source) 15 as a primary transfer voltage applying means (primary transfer voltage applying portion). In this embodiment, to the primary transfer roller 14, as the primary transfer voltage, for example, a DC voltage of +100 V is applied. For example, during full-color image formation, toner images of yellow, magenta, cyan, and black formed on the respective photosensitive drums are successively primary-transferred superposedly onto the intermediary transfer belt 10.

On an outer peripheral surface side of the intermediary transfer belt 10, at a position opposing the secondary transfer opposite roller (inner secondary transfer roller) 13, a secondary transfer roller (outer secondary transfer roller) 20, which is a roller type secondary transfer member as a secondary transfer means, is provided. The secondary transfer roller 20 is rotatably supported by secondary transfer roller bearings 22 at opposite end portions with respect to a rotational axis direction thereof. The secondary transfer roller 20 is pressed toward the secondary transfer opposite roller 13 and is contacted to the secondary transfer opposite roller 13 through the intermediary transfer belt 10, so that the secondary transfer roller 20 forms a secondary transfer portion (secondary transfer nip) N2 which is a contact portion where the intermediary transfer belt 10 and the secondary transfer roller 20 are in contact with each other. In this embodiment, the secondary transfer roller 20 is contacted to the intermediary transfer belt 20 by a pressing force (total pressure) of 50N and forms the secondary transfer portion N2. Further, in this embodiment, the secondary transfer roller 20 is rotated with rotation of the intermediary transfer belt 10. Further, in this embodiment, the secondary transfer roller 20 is a foamed elastic roller prepared by coating an outer periphery of a nickel-plated steel rod of 8 mm in outer diameter with a foamed rubber layer (foamed elastic member layer) adjusted to have a volume resistivity of $10^8$ Ω·cm and a thickness of 4 mm. In this embodiment, the foamed rubber layer is constituted by a foamed sponge member (foamed elastic member) principally comprising NBR and epichlorohydrin. In this embodiment, the secondary transfer roller 20 is 16 mm in outer diameter and is 216 mm in length with respect to the rotational axis direction. The toner image formed on the intermediary transfer belt 10 is transferred (secondary-transferred) onto the recording material P nipped and fed in the secondary transfer portion N2 by the intermediary transfer belt 10 and the secondary transfer roller 20. During a secondary transfer step, to the secondary transfer roller 20, a secondary transfer voltage (secondary transfer bias) of the polarity opposite to the normal charge polarity of the toner is applied from a secondary transfer voltage power source (high-voltage power source) 21 as a secondary transfer voltage applying means (secondary transfer voltage applying portion). Although the secondary transfer voltage is appropriately changed depending on a kind, an environment, or the like of the recording material P, to the secondary transfer roller 20, for example, a DC voltage of +1000 V is applied. Incidentally, in this embodiment, the secondary transfer voltage power source 21 is capable of outputting voltages of both the positive and negative polarities in a range of 100 V to 5000 V in absolute value. In this embodiment, the secondary transfer opposite roller 13 is electrically grounded (connected to the ground). The recording material (transfer material, recording medium, sheet) P is accommodated in a cassette 51 as a recording material accommodating portion, and is sent from the cassette 51 by a feeding roller 50 as a feeding member. This recording material P is conveyed to the secondary transfer portion N2 by a conveying roller 60 as a conveying member by being timed to the toner image on the intermediary transfer belt 10.

The recording material P on which the toner image is transferred is conveyed to a fixing device (fixing portion) 30 as a fixing means. The fixing device 30 heats and presses the recording material P carrying thereon the (unfixed) toner image in a fixing nip formed by a fixing roller 31 and a pressing roller 32 press-contacted to the fixing roller 31. By this, for example, toners of the four colors are melted and color-mixed, and are fixed (sticked) on the recording material P. The recording material P on which the toner image is fixed is discharged (outputted) to an outside of an apparatus main assembly 110 of the image forming apparatus 100. In this embodiment, the fixing roller (fixing member) 31 is an elastic roller of 18 mm in outer diameter in which an elastic layer of an insulating silicone rubber is formed around a metal bare tube and an outer peripheral surface of the elastic layer is coated with an insulating PFA tube. Further, this fixing roller 31 includes a halogen heater (not shown) as a heating means in a hollow portion. The halogen heater is in non-contact with the fixing roller 31 and generates heat by being supplied with a voltage by a power source (not shown). Further, in this embodiment, the pressing roller (pressing member) 32 is an elastic roller of 18 mm in outer diameter in which an elastic layer of an electroconductive silicone rubber is formed on an outer peripheral surface of a core metal and an outer peripheral surface of the elastic layer is coated with an electroconductive PFA tube. The fixing roller 31 and the pressing roller 32 form the fixing nip by being pressed by a pressing force of 10 kgf. The pressing roller 32 is rotationally driven by a driving motor (not shown) as a driving source constituting driving means, and the fixing roller 31 is rotated with rotation of the pressing roller 32. The recording material P is nipped and fed in the fixing nip by the fixing roller 31 and the pressing roller 32. The pressing roller 32 is connected from the core metal to the ground through a resistance element of 1000 MΩ. Electric charges on the fixing roller 31 and the pressing roller 32 are caused to escape to the ground, so that it is possible to suppress that the surface of the fixing roller 31 and the surface of the pressing roller 32 are electrically charged.

On the other hand, toner (primary transfer residual toner) remaining on the surface of the photosensitive drum 1 after the primary transfer step is removed and collected from the photosensitive drum 1 by a drum cleaning device 5 as a photosensitive member cleaning means. In this embodiment, the drum cleaning device 5 includes a cleaning blade 55 which contacts the photosensitive drum 1 and which scrapes off the primary transfer residual toner from the surface of the photosensitive drum 1. Further, on the outer peripheral surface side of the intermediary transfer belt 10, at a position opposing the secondary transfer opposite roller 13, a belt cleaning device 9 as an intermediary transfer member cleaning means is provided. Deposited matter, such as toner (secondary transfer residual toner) remaining on the intermediary transfer belt 10 after a secondary transfer step, is removed and collected from the intermediary transfer belt 10 by the belt cleaning device 9. In this embodiment, the belt cleaning device 9 includes a belt cleaning blade 91 which contacts the secondary transfer opposite roller 13 through the intermediary transfer belt 10 and which scrapes off the secondary transfer residual toner or the like from the surface of the intermediary transfer belt 10. In this embodiment, the belt cleaning blade 91 is formed of a polyurethane rubber as an elastic material, and contacts the secondary transfer opposite roller 13 through the intermediary transfer belt 10 at a contact pressure of 85.0 gf/cm.

Further, in this embodiment, the image forming apparatus 100 includes, as a toner detecting means (toner detecting portion) for detecting the toner on the intermediary transfer belt 10, a toner detecting sensor 101 constituted by a photo-sensor of a reflection type. The toner detecting sensor 101 is disposed at a position downstream of the primary transfer portion N1d of a most downstream image forming portion Sd for black and upstream of the secondary transfer portion N2 with respect to the movement direction of the surface of the intermediary transfer belt 10. Particularly, in this embodiment, the toner detecting sensor 101 is disposed in a position opposing the first stretching roller 11 through the intermediary transfer belt 10, and detects the toner image on the surface of the intermediary transfer belt 10 backed up by the first stretching roller 11. This toner detecting sensor 101 is used for calibration, and detects a density or a color misregistration amount of the toner patch (test toner image) formed on the intermediary transfer belt 10. In this embodiment, two toner detecting sensors 101 are disposed along a widthwise direction (direction substantially perpendicular to the surface movement direction) of the intermediary transfer belt 10. Each of these two toner detecting sensors 101 is disposed closer to an end portion than to a central portion with respect to the widthwise direction of the intermediary transfer belt 10.

Further, in this embodiment, in each image forming portion S, the photosensitive drum 1 and, as process means actable on the photosensitive drum 1, the charging roller 2, the developing device 4, and the cleaning device 5 are integrally assembled and form a process cartridge 17. The process cartridge 17 is detachably mountable to the apparatus main assembly 110 of the image forming apparatus 100 via mounting means such as a mounting guide, a positioning member, and the like which are provided in the apparatus main assembly 110 of the image forming apparatus 100.

Further, in this embodiment, an intermediary transfer belt unit 24 is constituted by the intermediary transfer belt 10, the plurality of stretching rollers 11, 12, and 13, the respective primary transfer rollers 14, the belt cleaning device 9, a frame for supporting these members, and the like. The intermediary transfer belt unit 24 is detachably mountable to the apparatus main assembly 110 of the image forming apparatus 100 via mounting means such as a mounting guide, a positioning member, and the like which are provided in the apparatus main assembly 110 of the image forming apparatus 100.

Incidentally, the image forming apparatus 100 is also capable of forming a single-color or multi-color image using only a desired one or some of the four image forming portions S.

Further, the image forming apparatus 100 of this embodiment is a printer meeting a process speed (corresponding to a peripheral speed of the photosensitive drum 1 and the intermediary transfer belt 10) of 148 mm/sec and A4-size paper.

Further, in this embodiment, as the developer, non-magnetic toner (non-magnetic one-component developer) of about 5 to 10 μm in particle size is used. Particularly, in this embodiment, the toner is non-magnetic toner (non-magnetic one-component developer) which is manufactured by a suspension polymerization and which has negative chargeability, and is 7.0 μm in average particle size. Further, in this embodiment, to the surface of the toner, an external additive of about 100 nm in particle size is externally added. Particularly, in this embodiment, to the surface of the toner, as a principal external additive, silica ($SiO_2$) of 100 nm in number-average particle size is externally added. Here, the principal external additive is an external additive, of external additives externally added to the toner, of which addition amount is largest. This toner is negatively charged when the toner is carried on the developing roller 41. The volume-average particle size of the toner and the number-average particle size of the external additive were measured by a laser diffraction particle size (distribution) analyzer ("LS-230", manufactured by Beckman Coulter, Inc.).

2. Control Mode

FIG. 2 is a schematic block showing a control mode of the image forming apparatus 100 of this embodiment. The image forming apparatus 100 includes an engine controller 210 as a control means (control portion) for controlling the entirety of the image forming apparatus 100 thereof. The engine controller 210 incorporates a CPU circuit portion 150, as a calculation controller, and a ROM 151 and a RAM 152 which are storing portions. Further, the CPU circuit portion 150 may be provided with a non-volatile memory 153 as a storing portion. The CPU circuit portion 150 carries out integrated control of respective portions of the image forming apparatus 100, such as a primary transfer controller 201, a secondary transfer controller 202, a developing controller 203, an exposure controller 204, a charging controller 205, and the like on the basis of a control program stored in the ROM 151. An environment table for enabling control depending on an environment (at least one of temperature and humidity on at least one of an inside and an outside of the image forming apparatus 100), and a paper width/paper thickness correspondence table for enabling control depending on a kind of the recording material P, and the like table are stored in the ROM 151. Further, these pieces of information are reflected in control by being read from the ROM 151 by the CPU circuit portion 150. The RAM 152 is used for temporarily holding control data and is used as an operation area of a calculation (computation) process with the control.

The primary transfer controller 201 and the secondary transfer controller 202 control the primary transfer power source) 15 and the secondary transfer power source 21, respectively, under control of the engine controller 210. In this embodiment, the primary transfer controller 201 and the secondary transfer controller 202 can control voltages outputted from the primary transfer power source 15 and the secondary transfer power source 21, respectively, on the basis of a current value or the like detected by an associated one of current detecting portions. Further, in this embodiment, the primary transfer controller 201 and the secondary transfer controller 202 are capable of carrying out control so as to output voltages of predetermined values from primary transfer power source 15 and the secondary transfer power source 21, respectively. The charging controller 205 controls the charging power source 18 under control of the engine controller 210. The developing controller 203 controls the developing power source 19 under control of the engine controller 210. The exposure controller 204 controls the exposure device 3 under control of the engine controller 210. Further, in this embodiment, the engine controller 210 controls the development contact and separation mechanism 43 and a secondary transfer contact and separation mechanism 23 (described later). Further, to the engine controller 210, the driving motor (herein, also referred to as the "main motor") 70 as the driving source for the photosensitive drum 1, the intermediary transfer belt 10, and the developing roller 41 is connected. Further, to the engine controller 210, an operating portion (operation panel) 206, an environment sensor 300, and the like are connected. The operating portion 206 includes a display portion such as a liquid crystal display for displaying information to an operator such as a user or a service person under control of the engine controller 210, and includes an inputting portion such as keys for inputting information to the engine controller 210 depending on an operation of the operator. The environment sensor 300 includes a temperature sensor 301 and a humidity sensor 302, and detects a temperature and a humidity of an inside of the image forming apparatus 100 in this embodiment, and then inputs a signal indicating a detection result of the engine controller 210. The engine controller 210 carries out control of a process condition of the image formation on the basis of the environment information (temperature information, humidity information) acquired by the environment sensor 300.

The controller 200 receives print information (image information), and a print instruction (start instruction, various pieces of setting information) from the host computer 199. The controller 200 converts the information received from the host computer 199 into information on image formation in the image forming apparatus 100, and then inputs the information to the engine controller 210. Then, the engine controller 210 executes a print job (described later) by controlling the respective portions of the information 100 such as the above-described respective controllers (the primary transfer controller 201, the secondary transfer controller 202, the developing controller 203, the exposure controller 204, the charging controller 205) and the like. Incidentally, in this embodiment, the charging power source 18 and the developing power source 19 are common to the four image forming portions Sa to Sd. Further, in this embodiment, starts and stops of applications of the charging voltage and the developing voltage are carried out in the four image forming portions Sa to Sd in synchronism with each other. Further, in this embodiment, the primary transfer power source 15 is provided independently for the four image forming portions Sa to Sd, but a start and a stop of application of the primary transfer voltage are carried out in the four image forming portions Sa to Sd in synchronism with each other. Further, in this embodiment, the driving motor (main motor) 70 as the driving source for the four image forming portions Sa to Sd and the intermediary transfer belt 10 is common to the four image forming portions Sa to Sd and the intermediary transfer belt 10. Further, rotations of the photosensitive drums 1 of the four image forming portions Sa to Sd and a start and a stop of rotation of the intermediary transfer belt 10 are carried out in synchronism with each other. Further, in this embodiment, in each of the image forming portions Sa to Sd, the developing roller 41 is driven by transmitting thereto a driving force from the driving motor (main motor) 70 as the driving source for the photosensitive drum 1. However, drive transmission from the driving source to the developing roller 41 of each of the image forming portions Sa to Sd can be released by a clutch. For that reason, a start and a stop of rotation of the developing roller 41 can be executed independently in the image forming portions Sa to Sd. Further, in this embodiment, a part of the constitution (such as the above-described moving member) of the development contact and separation mechanism 43 is made common to the four image forming portions Sa to Sd, and the developing devices 4 are disposed in contact positions or separated positions in synchronism with each other in the image forming portions Sa to Sd. However, the present invention is not limited thereto, and at least one of the charging power sources 18 of the four image forming portions Sa to Sd and the developing power sources 19 of the four image forming portions Sa to Sd may be provided independently. Further, at least one of the driving sources for the photosensitive drums 1 of the four image forming portions Sa to Sd, the developing rollers 41 of the four image forming portions Sa to Sd, and the intermediary transfer belt 10 may be provided independently. Further, the development contact and separation mechanism 43 may be constituted so that the developing device 4 of at least one image forming portion S can be moved independently. Further, at least one of the driving sources, various power sources, and the development contact and separation mechanism 43 may be made common to only some of the four image forming portions Sa to Sd such as for colors (yellow, magenta, and cyan) and the black.

Here, the image forming apparatus 100 executes the print job (printing operation) which is a series of operations which is started by a single start instruction and in which an image is formed and outputted on a single recording material P or images are formed and outputted on a plurality of recording materials P. In this embodiment, the start instruction is inputted to the image forming apparatus 100 from the host computer (external device) 199 such as a personal computer connected to the image forming apparatus 100. The print job generally includes an image forming step, a pre-rotation step, a sheet (paper) interval step in the case where the images are formed on the plurality of recording materials P, and a post-rotation step. The image forming step refers to a period in which formation of the electrostatic latent image for the image actually formed and outputted on the recording material P, formation of the toner image, primary transfer of the toner image, and secondary transfer of the toner image are performed, and during image formation (image forming period) means this period. Specifically, at positions where the respective steps of the formation of the electrostatic latent image, the formation of the toner image, the primary transfer of the toner image, and the secondary transfer of the toner image are carried out, timings during the image formation are different from each other. The pre-rotation step is a period in which a preparatory operation before the image forming step, from input of the start instruction until image formation is actually started, is performed. The sheet interval step (recording material interval step, image interval step) is a period corresponding to a timing between a recording material P and a subsequent recording material P when the images are continuously formed on the plurality of recording materials P (continuous image formation). The post-rotation step is a period in which a post-operation (preparatory operation) after the image forming step is performed. During non-image formation (non-image forming period) is a period other than during image formation and includes the above-described pre-rotation step, sheet interval step, and post-rotation step, and further a pre-multi-rotation step, which is a preparatory step during turning-on of a power source (main switch) of the image forming apparatus 100 or during restoration from a sleep state. Further during the non-image formation includes a stand-by state, the sleep state and a turning-off state of the power source of the image forming apparatus 100. Incidentally, the stand-by state is a state in which the power source of the image forming apparatus 100 is turned on and in which the image forming apparatus 100 awaits input of information on the print job. Further, the sleep state is a state in which an electric power consumption amount is smaller than an electric power consumption amount in the stand-by state when the power source of the image forming apparatus 100 is turned on and in which the image forming apparatus 100 awaits restoration to the stand-by state or the like.

3. Secondary Transfer Contact and Separation Mechanism

Parts (a) and (c) of FIG. 3 are schematic sectional views of a periphery of the intermediary transfer belt unit 24 in this embodiment. Part (a) of FIG. 3 shows a state in which the secondary transfer roller 20 contacts the intermediary transfer belt 10, and part (c) of FIG. 3 shows a state in which the secondary transfer roller 20 is separated from the intermediary transfer belt 10. Further, parts (b) and (d) of FIG. 3 are enlarged views of the periphery of the secondary transfer roller 20 in the states of parts (a) and (c) of FIG. 3, respectively.

As shown in parts (a) and (c) of FIG. 3, the secondary transfer roller 20 is rotatably supported by the secondary transfer roller bearings 22 at opposite end portions thereof with respect to a rotational axis direction thereof. Further, in this embodiment, the secondary transfer roller 20 is movable to the contact position (parts (a) and (b) of FIG. 3) where the secondary transfer roller 20 contacts the intermediary transfer belt 10 and the separated position (parts (c) and (d) of FIG. 3) in which the secondary transfer roller 20 is separated from the intermediary transfer belt 10. Further, the secondary transfer roller 20 is urged, at the opposite end portions thereof with respect to the rotational axis direction thereof, in a direction from the separated position toward the contact position by the pressing springs 25 which are urging members as urging means. In the opposite end portions of the secondary transfer roller 20 with respect to the rotational axis direction of the secondary transfer roller 20, the secondary transfer roller bearings 22 and the pressing springs 25 are held by holding members 26. Movement of the secondary transfer roller 20 to the contact position and the separated position is executed by the secondary transfer contact and separation mechanism 23 as the moving means. The secondary transfer contact and separation mechanism 23 moves the secondary transfer roller 20 by, for example, a solenoid, a cam mechanism or the like. For example, the secondary transfer contact and separation mechanism 23 includes a driving portion 28 provided with a driving source such as a motor and includes a moving member 27 such as a cam for moving the secondary transfer roller 20 by being driven by the driving portion 28. Further, the secondary transfer contact and separation mechanism 23 is capable of executing pressing of the above-described moving member 27 against the secondary transfer roller bearing 22 and release of the pressing. By pressing the secondary transfer roller bearing 20 by the moving member 27 against a pressing force of the above-described pressing spring 25, the secondary transfer roller 20 can be separated from the intermediary transfer belt 10. Further, the pressing of the moving member 27 against the secondary transfer roller bearing 22 is released, so that the secondary transfer roller 20 is moved by the pressing force of the pressing spring 25 and thus the secondary transfer roller 20 can be contacted to the intermediary transfer belt 10.

In the image forming apparatus 100, by the secondary transfer contact and separation mechanism 23, the secondary transfer roller 20 can be disposed in the contact position, for example, during the timing-on of the power source of the image forming apparatus 100, during the execution of the print job, during the execution of the calibration, or the like. Further, in the image forming apparatus 100, by the secondary transfer contact and separation mechanism 23, the secondary transfer roller 20 can be disposed in the separated position in the stand-by state, the sleep state, the power source off state, or the like. In this embodiment, in the image forming apparatus 100, by the secondary transfer contact and separation mechanism 23, the secondary transfer roller 20 is disposed in the contact position when the drive of the main motor is started and is disposed in the separated position when the drive of the main motor is stopped. However, the present invention is not limited to such a constitution, and, for example, the secondary transfer contact and separation mechanism 23 may be operated by an operation of the moving member, such as the cam, by an operator, so that the secondary transfer roller 20 may be manually disposed in the contact position and the separated position. In this case, in a state in which the intermediary transfer belt unit 24 is mounted in the apparatus main assembly 110, the secondary transfer roller 20 may be substantially always disposed in the contact position. Further, when the intermediary transfer belt unit 24 is mounted in or demounted from the apparatus main assembly 110 or when jam clearance (removal of jammed paper) is performed, the secondary transfer roller 20 can be disposed in the separated position by operating the secondary transfer contact and separation mechanism 23 by the operator. Further, when the intermediary transfer belt unit 24 is mounted in or demounted from the apparatus main assembly 110 or when the jam clearance (removal of jammed paper) is performed, the secondary transfer roller 20 can be disposed in the contact position by operating the secondary transfer contact and separation mechanism 23 by the operator.

Further, the present invention is also applicable to an image forming apparatus which does not include the secondary transfer contact and separation mechanism and which has a constitution in which the secondary transfer roller 20 is substantially always contacted to the intermediary transfer belt 10.

4. Calibration

FIG. 4 is a schematic view showing toner patches for calibration (toner patch for density adjustment, toner patch for color misregistration adjustment) on the intermediary transfer belt 10. In this embodiment, two toner detecting sensors 101 are disposed with respect to the widthwise direction of the intermediary transfer belt 10. Each of the two toner detecting sensors 101 is disposed in a position closer to an associated end portion of the opposite end portions than to a central portion with respect to the widthwise direction of the intermediary transfer belt 10. Of these toner detecting sensors 101, one is a first toner detecting sensor 101*e*, and the other is a second toner detecting sensor 101*f*.

In the calibration, a plurality of toner patches are formed in an array along a movement direction of the surface of the intermediary transfer belt 10. In this embodiment, the toner patches are formed in two arrays consisting of a first toner patch array 102 corresponding to the first toner detecting sensor 101*e* and a second toner patch array 103 corresponding to the second toner detecting sensor 101*f*. In an example shown in FIG. 4, a plurality of toner patches for density adjustment and a plurality of toner patches for color misregistration adjustment are formed in an array (one line) as the first toner patch array 102, and a plurality of toner patches for density adjustment are formed in an array as the second toner patch array 103.

Incidentally, the number of arrays of the toner patches for the calibration is not limited to two (arrays) but may also be one (array) or three or more (arrays). The toner detecting sensor(s) 101 may only be required to be disposed in the number corresponding to the number of arrays of the toner patches.

The engine controller 210 is capable of executing the calibration, for example, every predetermined number of sheets subjected to image formation or in the case where a change in predetermined environment condition, during the non-image formation such as the pre-rotation step, the pre-multi-rotation step, the post-rotation step, the sheet interval step, or the like. Further, the engine controller 210 can execute the calibration during the non-image formation as described above depending on an operation by the operator in the operating portion 206 or in the host computer 199. In an example shown in FIG. 4, in an execution timing of a single calibration, the case where the toner patches for the density adjustment and the toner patches for the color misregistration adjustment are formed in synchronism with each other is shown, but these toner patches may be formed in different timings.

In this embodiment, the calibration is executed in the state in which the secondary transfer roller 20 is contacted to the intermediary transfer belt 10. This is because accuracy of the calibration is improved by executing the calibration under the substantially same condition as the condition during the image formation. Further, this is because down time (time in which the image cannot be outputted for the adjustment or the like) is reduced by reducing a time required for a contact and separation operation of the secondary transfer roller 20. For that reason, in this embodiment, the toner patches pass through the secondary transfer portion N2 in the state in which the secondary transfer roller 10 is contacted to the intermediary transfer belt 10. The toner patches are required to be sent to the belt cleaning device 9 by being passed through the secondary transfer portion N2. Therefore, in this embodiment, in order to suppress that the toner patches are electrostatically deposited on the secondary transfer roller 20, at least when the toner patches pass through the secondary transfer portion N2, a voltage of the same polarity as the normal charge polarity of the toner is applied to the secondary transfer roller 20. By this, by an electrical repelling force between the surface potential of the secondary transfer roller 20 and the electric charges of the toner, electrostatic deposition of the toner on the secondary transfer roller 20 is suppressed. In this embodiment, during the calibration, for example, a voltage of −1000 V is applied to the secondary transfer roller 20 at least when the toner patches pass through the secondary transfer portion N2. Here, from a viewpoint of the accuracy of the calibration, the secondary transfer roller 20 can be separated from the intermediary transfer belt 10 after a trailing end of the toner patch array with respect to the feeding direction passes through a detecting portion of the toner detecting sensor 101. However, from a relationship with a distance from the detecting portion of the toner detecting sensor 101 to the secondary transfer portion N2 in the surface movement direction of the intermediary transfer belt 10 or the like, during detection by the toner detecting sensor 101, at least a part of the toner patches passes through the secondary transfer portion N2 in many instances. In this embodiment, from viewpoints of the accuracy of the calibration and the reduction of the down time which are described above, the secondary transfer roller 20 is contacted to the intermediary transfer belt 10 in a full period in which a whole region from a leading end to a trailing end of the toner patches with respect to the feeding direction passes.

Incidentally, as regards a specific method of the density adjustment and the color misregistration adjustment in the calibration, for example, a known method can be used appropriately and arbitrarily. Accordingly, herein, the specific method of the density adjustment and the color misregistration adjustment will be omitted from further description.

5. Application of Protective Agent onto Secondary Transfer Roller

<Other>

As described above, the contamination of the secondary transfer roller 20 with the toner occurs in some instances. For example, even when the voltage of the same polarity as the normal charge polarity of the toner is applied to the secondary transfer roller 20, in the case where a physical depositing force between the surface of the secondary transfer roller 20 and the toner is higher (larger) than an electrical repelling force, the contamination of the secondary transfer roller 20 with the toner occurs in some instances. Particularly, in the case where the secondary transfer roller 20 is in a new article state or in a state close to the new article state, the depositing force between the secondary transfer roller surface and the toner is high in some cases, so that the contamination of the secondary transfer roller 20 with the toner patches is liable to occur in some instances. When the secondary transfer roller 20 is contaminated with the toner, the following phenomenon is liable to occur in some cases. That is, by an impact when the recording material P enters the secondary transfer portion N2 and passes through the secondary transfer portion N2 during the image formation, the toner deposited on the secondary transfer roller 20 is deposited on a leading end (edge) or a trailing end (edge) of the recording material P, so that a phenomenon such that the edge of the recording material P is contaminated with the toner ("paper edge contamination") occurs in some cases.

Therefore, in this embodiment, the image forming apparatus 100 is capable of executing a sequence (application sequence, operation in an application mode) in which the surface of the secondary transfer roller 20 is coated with a protective agent Z in the state in which the secondary transfer roller 20 is contacted to the intermediary transfer belt 10. In this embodiment, in the application sequence, the protective agent is applied onto the surface of the secondary transfer roller 20 in a position including a position where at least the first and second toner patch arrays 102 and 103 pass with respect to the rotational axis direction of the secondary transfer roller 20. By this, it is possible to suppress that the secondary transfer roller 20 is contaminated with the toner patches in which the toner is of a conspicuous color such as black. Here, in order to satisfactorily suppress the contamination of the secondary transfer roller 20 with the toner, the protective agent Z may preferably satisfy a condition such that a "physical depositing force F1 between a surface of the secondary transfer roller 20 and the protective agent Z" is larger than a "physical depositing force F2 between the protective agent Z and the toner T". Further, the application sequence may preferably be executed at least in a state (state in which a use history is small) which is a new article state or which is close to the new article state. By this, it is possible to suppress the contamination of the secondary transfer roller 20 with the toner patch which is liable to occur particularly in a state in which the secondary transfer roller 20 is in the new article state or in the state close to the new article state and in which the depositing force between the surface of the secondary transfer roller 20 and the toner is high. Further, as the protective agent Z, a protective agent which is not readily conspicuous even if the protective agent is deposited on the recording material P may preferably be used. Further, when the protective agent Z is applied onto the secondary transfer roller 20 (when the protective agent Z passes through the secondary transfer portion N2 in this embodiment), the secondary transfer roller 20 may preferably be contacted to the intermediary transfer belt 10 in the substantially same condition (in a pressed state such as a contact pressure) as a condition during the image formation. By this, the protective agent Z which is maintained in the state in which the protective agent Z is physically deposited on the secondary transfer roller 20 in the condition during the image formation and which is not readily moved to the recording material P can be applied onto the secondary transfer roller 20.

In the following, first, an operation of the application sequence will be described, and then a depositing force of the protective agent Z and a measuring method of the depositing force will be described.

<Application Sequence>

The protective agent Z applied onto the secondary transfer roller 20 may preferably be less conspicuous even if the protective agent Z is deposited on the recording material P as described above. This is because there is a possibility that a phenomenon that the protective agent Z deposited on the secondary transfer roller 20 is deposited on the leading end (edge) or the trailing end (edge) of the recording material P ("paper edge contamination") is caused to occur by the impact when the recording material P enters the secondary transfer portion N2 or passes through the secondary transfer portion N2 during the image formation. That is, there is a possibility that the protective agent Z itself is deposited on the recording material P during the image formation.

Therefore, in this embodiment, as the protective agent Z, yellow toner which is the toner less conspicuous even when deposited on the recording material P is used. Particularly, in this embodiment, the yellow toner as the protective agent Z is supplied from the image forming portion Sa for yellow to the intermediary transfer belt 10 and then is applied onto the surface of the secondary transfer roller 20. That is, in this embodiment, as an example of a supplying means for supplying the protective agent Z applied onto the secondary transfer roller 20, the image forming portion Sa for yellow is used.

By using the toner as the protective agent, there is no need to provide an applying device separately. For that reason, it is possible to suppress increases in size and cost of the apparatus.

Incidentally, in this embodiment, a surface layer of the secondary transfer roller 20 is constituted by a foamed rubber layer. In this case, the protective agent Z may preferably be deposited on a wall portion of the foamed rubber layer of the secondary transfer roller 20 directly contacting the intermediary transfer belt 10, and the toner is not required to be deposited onto an inside of a void of the foamed rubber layer. An application amount of the protective agent Z onto the secondary transfer roller 20 can be adjusted depending on a density or a size of the toner image for application formed with the yellow toner as the protective agent Z as described later.

FIG. 5 is a flowchart showing an outline of a procedure of the application sequence in this embodiment. In this embodiment, the case where the application sequence is started from a state (stand-by state, sleep state, power source-off state) in which the drive of the image forming apparatus 100 is stopped and then is stopped again after an end of the application sequence is taken as an example.

The engine controller 210 starts the application sequence (S11). For example, the engine controller 210 is capable of executing the application sequence in the case where an instruction by an operator such as a user or a service person is inputted. The operator is capable of inputting, to the engine controller 210, the instruction for manually executing the application sequence by an operation in the operating portion 206 or an operation in the host computer 199. For example, the operator is capable of inputting the instruction, to the engine controller 210, so as to execute the application sequence in the pre-multi-rotation during actuation of the apparatus main assembly 110 immediately after exchange in the case of the exchange of the secondary transfer roller 20 to a new article (new secondary transfer roller) as in the following manner. By this, in the case where the secondary transfer roller 20 is in a new article state or in a state close to the new article state, the application sequence can be executed. Or, the operator is capable of inputting, to the engine controller 210, so as to execute the application sequence at an arbitrary timing such as the case where the paper edge contamination actually occurred.

Further, the engine controller 210 is capable of executing the application sequence depending on the input of the information by the operator even when the instruction is not a direct instruction of the execution of the application sequence. For example, even when the apparatus main assembly 110 of the image forming apparatus 100 is not a new article, there is a case that the secondary transfer roller 20 is exchanged to a new article by the operator such as the service person. In such a case, the operator such as the service person is made capable of inputting a command indicating exchange of the secondary transfer roller 20 from the operating portion 206 or the host computer 199 to the engine controller 210. Then, the engine controller 210 detects that the secondary transfer roller 20 was exchanged to the new article thereof by the input of this command, and is capable of executing the application sequence in the pre-multi-rotation or the like (before first image formation) during actuation of the apparatus main assembly 110 immediately after the exchange.

Further, the engine controller 210 is capable of executing the application sequence on the basis of result of necessity discrimination as the whether or not an application sequence set in advance is required to be executed. For example, the engine controller 210 is capable of discriminating the necessity of the application sequence on the basis of execution request of the calibration. That is, in the case where the calibration is executed, the engine controller 210 is capable of executing the application sequence before execution of the calibration. Here, the engine controller 210 executes the calibration at the predetermined timing as described above. Further, the application sequence is not limited to the application sequence executed before the execution of the calibration during every execution of the calibration. For example, the engine controller 210 is capable of executing the application sequence, as a predetermined period corresponding to a new article state of the secondary transfer roller 20 or a state close to the new article state, which are set in advance, a period from a start of use of a new secondary transfer roller 20 (image forming apparatus 100) to before execution of calibration in a predetermined number of times. In this case, for example, the engine controller 210 is provided with the non-volatile memory 153 functioning as an execution number counter for the calibration, and causes this non-volatile memory 153 to update and store the number of times of the execution of the calibration every execution of the calibration. Then, the application sequence is executed before the execution of the calibration until the predetermined number of times. The above-described predetermined number of times can be appropriately set depending on ease of deposition of the toner onto the secondary transfer roller 20 or the like, but can be made one time to several times (for example, 3 to 10 toners). Incidentally, in the case where the secondary transfer roller 20 is exchanged as described above, the above-described execution number counter for the calibration is reset to an initial value (for example, 0), and then the application sequence may be executed before execution of calibration in a predetermined number of times similarly as described above.

When the application sequence is started, the engine controller 210 causes the main motor to start drive (S12). Here, in order to physically apply the yellow toner as the protective agent Z onto the secondary transfer roller 20, at least when the yellow toner as the protective agent Z passes through the secondary transfer portion N2, the secondary transfer roller 20 is put in a state in which the secondary transfer roller 20 is contacted to the intermediary transfer belt 10. Particularly, in this embodiment, in order to physically apply the yellow toner as the protective agent Z onto the secondary transfer roller 20 under the substantially same condition as the condition during the image formation, the secondary transfer roller 20 is disposed in the contact position so as to be contacted to the intermediary transfer belt 10 under the substantially same condition as the condition during the image formation. Incidentally, in this embodiment, the engine controller 210 causes the secondary transfer contact and separation mechanism 23 to bring the secondary transfer roller 20 into contact with the intermediary transfer belt 10 substantially simultaneously with the start of the drive of the main motor.

Next, the engine controller 210 causes the various high-voltage power sources to start application of predetermined voltages (S13). Specifically, a predetermined image (toner image for application) is formed with the yellow toner as the protective agent Z, so that the engine controller 210 causes the charging power source 18 and the primary transfer power source 15 to start application of the charging voltage and the primary transfer voltage, which are substantially equal to those during normal image formation, to the charging roller 2 and the primary transfer roller 14, respectively. Further, in order to apply the yellow toner as the protective agent Z onto the secondary transfer roller 20 by a physical depositing force exceeding an electrostatic repelling force, application of a voltage, as an application (coating) voltage, of the same polarity as the normal charge polarity from the secondary transfer power source 21 to the secondary transfer roller 20 is started. Incidentally, this application voltage is applied to the secondary transfer roller 20 at least when the yellow toner as the protective agent Z passes through the secondary transfer portion N2. Incidentally, application of the application voltage is not limited to the application of the voltage of the same polarity as the normal charge polarity of the toner as in this embodiment, but a functional effect of the present invention can be obtained under application of a voltage of an opposite polarity to the normal charge polarity of the toner or even when the voltage is not applied. However, for the reason described later, it is undesirable that an application amount of the protective agent onto the secondary transfer roller 20 is excessively large, and in order that the application amount is made a necessary minimum amount, it is preferable that the voltage of the same polarity as the normal charge polarity of the toner is applied as the application voltage.

After the voltages applied from the above-described various high-voltage power sources are increased to predetermined values and then are stabilized, in preparation for formation of the toner image for application, the engine controller 210 causes the development contact and separation mechanism 43 to bring the developing roller 41 into contact with the photosensitive drum 1 (S14). Incidentally, in this embodiment, when the developing roller 41 is contacted to the photosensitive drum 1, the engine controller 210 causes the developing power source 19 to start application of the same developing voltage as the developing voltage during the normal image formation. Thereafter, in order to form the toner image for application with the yellow toner as the protective agent Z, the engine controller 210 causes the exposure device 3*a* to expose the photosensitive drum 1*a* to light in the image forming portion Sa for the yellow (S15). By this, in the image forming portion Sa for the yellow, the toner image for application is formed on the photosensitive drum 1*a* with the yellow toner, and then this toner image for application is transferred onto the intermediary transfer belt 10. When development of the toner image for application in the image forming portion Sa for the yellow is ended, the engine controller 210 causes the development contact and separation mechanism 43 to separate the developing roller 41 from the photosensitive drum 1 (S16). Incidentally, in this embodiment, when the developing roller 41 is separated from the photosensitive drum 1, the engine controller 210 causes the developing power source 19 to stop the application of the developing voltage to the developing roller 41. The yellow toner as the protective agent Z reaches the secondary transfer portion N2 with rotation of the intermediary transfer belt 10, so that the yellow toner is applied onto the surface of the secondary transfer roller 20 (S17).

The engine controller 210 executes the following cleaning operation after the application of the protective agent Z is ended (after the yellow toner as the protective agent Z passes through the secondary transfer portion N2) (S18). That is, the engine controller 210 executes the cleaning operation for removing, from the secondary transfer roller 20, the protective agent Z which possibly exists as a part of the protective agent Z (yellow toner) deposited on the surface of the secondary transfer roller 20 and which is charged to the opposite polarity to the normal charge polarity. Specifically, in the cleaning operation, to the secondary transfer roller 20, at least a voltage of the opposite polarity to the normal charge polarity of the protective agent Z (yellow toner) is applied, so that electrostatic cleaning of the secondary transfer roller 20 is carried out. Particularly, in this embodiment, in the cleaning operation, the voltage of the opposite polarity to the normal charge polarity of the protective agent Z (yellow toner) and a voltage of the same polarity as the normal charge polarity of the protective agent Z are alternately applied to the secondary transfer roller 20. Thereafter, the engine controller 210 causes the various high-voltage power sources and the main motor to stop the application of the voltages and the drive of the motor (S19), and then ends the application sequence. Incidentally, in this embodiment, the engine controller 210 causes the secondary transfer contact and separation mechanism 23 to separate the secondary transfer roller 20 from the intermediary transfer belt 10 substantially simultaneously with the stop of the drive of the main motor.

Here, in this embodiment, from a viewpoint of simplification of the apparatus structure or the like, as described above, commonality of structures of the driving sources, the various high-voltage power sources, and the development contact and separation mechanism is realized. For that reason, in this embodiment, in the application sequence, also in the image forming portions S other than the image forming portion Sa for the yellow, the drive of the photosensitive drum 1 and the developing roller 41, the contact of the developing roller 41 to the photosensitive drum 1, and the application of the charging voltage, the developing voltage, and the primary transfer voltage are carried out. However, in the image forming portions S other than the image forming portion Sa for the yellow, there is no need to carry out the drive of the photosensitive drum 1 and the developing roller 41, the contact of the developing roller 41 to the photosensitive drum 1, and the application of the charging voltage, the developing voltage, and the primary transfer voltage.

For example, in the case where the driving sources for the photosensitive drums 1 are separately provided between the image forming portion Sa for the yellow and other image forming portions S and thus the drive and the stop of the drive of these driving sources can be controlled separately from each other, in the above-described other image forming portions S, the photosensitive drums 1 can be put in a drive-stop state. In this case, in the above-described other image forming portions S, for example, the intermediary transfer belt 10 is separated from the photosensitive drums 1 by moving the primary transfer rollers 14 in a direction in which the primary transfer rollers 14 are spaced from the photosensitive drums 1. For this purpose, a belt contact and separation mechanism capable of moving the primary transfer rollers 14 of the other image forming portions S in a direction in which the primary transfer rollers 14 are spaced from the photosensitive drums 1 can be provided in the image forming apparatus 100.

Further, in each of the other image forming portions S, the developing roller 41 can be prevented from contacting the photosensitive drum 1. Further, in each of the other image forming portions S, the charging voltage, the developing voltage, and the primary transfer voltage are prevented from being applied.

FIG. 6 is a timing chart showing operation timings of the respective portions in the application sequence in this embodiment. In this embodiment, in the case where in accordance with the flowchart of FIG. 5, the application sequence is started from a state in which the drive of the image forming apparatus 100 is stopped and then the drive of the image forming apparatus 100 is stopped again after the application sequence is ended is taken as an example.

FIG. 6 shows a driving state of the main motor, an application state of the charging voltage, an application state of the primary transfer voltage, an application state of the voltage to the secondary transfer roller 20, a contact and separation state of the developing roller 41 relative to the photosensitive drum 1, and an exposure timing of the exposure device 3*a*. Incidentally, as regards a driving state of the main motor, a state (OFF) in which the photosensitive drum 1 is at rest, a state (OFF) in which the photosensitive drum 1 is rotated at a target rotational speed depending on a process speed, and a transition state from the OFF state to the ON state and from the ON state to the OFF state are shown. Further, as regards the contact and separation state of the developing roller 41 relative to the photosensitive drum 1, a state in which the developing roller 41 is in the contact position, a state in which the developing roller 41 is in the separated position, and a state between these states are shown.

At a time t0, the application sequence is started (S11). Thereafter, at a time t1, rotation of the main motor is started (S12). Incidentally, in this embodiment, at the time t1, which is the substantially same time as the time of the start of the rotation of the main motor, the secondary transfer roller 20 is contacted to the intermediary transfer belt 10. Further, at the time t1, which is the substantially same time as the time of the start of the rotation of the main motor, the application of the charging voltage and the application of the voltage to the secondary transfer roller 20 are started (S13). As the charging voltage, a voltage which is substantially equal to the charging voltage during the normal image formation is applied. In this embodiment, at this time, the charging voltage of −1300 V is applied. Further, to the secondary transfer roller 20, an application voltage (negative application voltage) of the same polarity as the normal charge polarity of the toner is applied so that the protective agent Z is applied to the secondary transfer roller 20 only by the physical deposition force exceeding the electrostatic repelling force. In this embodiment, at this time, the application voltage of −500 V is applied. Further, at a time t2 until the surface of the photosensitive drum 1 having passed through the charging portion when the charging process is started reaches the primary transfer portion N1, application of the primary transfer voltage is started (S13).

As the primary transfer voltage, a voltage substantially equal to the primary transfer voltage during the normal image formation is applied. In this embodiment, at this time, the primary transfer voltage of +100 V is applied. The above-described rising of the charging voltage, the voltage to the secondary transfer roller 20, and the primary transfer voltage corresponds to rising of the voltages from the various high-voltage power sources (S13). After the rising of the voltages from the various high-voltage power sources, at a time t3, the developing roller 41 is contacted to the photosensitive drum 1 (S14). Incidentally, in this embodiment, at the time t3 which is the substantially same time as the time of contact of the developing roller 41 with the photosensitive drum 1, application of the developing voltage substantially equal to the developing voltage during the normal image formation is applied. Then, in a period from a time t4 to a time t5, the photosensitive drum 1*a* of the image forming portion Sa for the yellow is exposed to light, so that the electrostatic latent image is formed on the photosensitive drum 1*a*. The electrostatic latent image is developed with the yellow toner as the protective agent Z, so that the toner image for application is formed (S15). Incidentally, in this embodiment, exposure intensity of the exposure device 3*a* is adjusted so that the toner image for application becomes a solid image. After the exposure is ended at the time t5, at a time t6, the developing roller 41 is separated from the photosensitive drum 1 (S16). This is because deterioration of the developing roller 41 and the photosensitive drum 1 is suppressed. Incidentally, in this embodiment, at the time t6 which is the substantially same time as the time of the separation of the developing roller 41 from the photosensitive drum 1, the application of the developing voltage is stopped. The exposure is carried out in the period from the time t4 to the time t5, and then the electrostatic latent image is developed into the toner image for application. The toner image for application formed on the photosensitive drum 1 reaches (passes through) the secondary transfer portion N2 in a period from a time t7 to a time t8. At this time, the protective agent Z is applied onto the secondary transfer roller 20 (S17).

When the protective agent Z exists on the surface of the secondary transfer roller 20, even when the toner patch passes through the secondary transfer portion N2, the toner is not readily deposited physically on the secondary transfer roller 20. In some cases, the secondary transfer roller 20 is contaminated with the toner image, such as the toner patch, formed only in a specific position with respect to the rotational axis direction of the secondary transfer roller 20. Particularly, in the case where the secondary transfer roller 20 is in the new article state or in the state close to the new article state, a depositing force between the surface of the secondary transfer roller 20 and the toner is high in some instances. This is because the physical depositing force of the toner onto the secondary transfer roller 20 is liable to become large in the new article state or in the state close to the new article state due to, for example, the material and the component of the elastic layer of the secondary transfer roller 20 and in addition, a shape (nap or the like) of the surface of the elastic layer. When the secondary transfer roller 20 is continuously used, there is a tendency that the depositing force with the toner becomes small due to gradual deposition of the fog toner or the like or gradual abrasion of the fog toner or the like. Therefore, in this embodiment, the application sequence is executed preferably at least in the new article state of the secondary transfer roller 20 or in the state close to the new article state. By this, contamination of the secondary transfer roller 20, with the toner, in a specific position particularly in the new article state or in the state close to the new article state is suppressed, so that paper edge contamination can be suppressed.

Incidentally, as described above, the paper edge contamination by the protective agent Z itself can be suppressed because as the protective agent Z, toner of a color which is less conspicuous even when the toner is deposited on the recording material P is used. Further, even when the protective agent Z applied onto the secondary transfer roller 20 is deposited on the recording material P, all the protective agent Z applied onto the secondary transfer roller 20 is not necessarily deposited on the leading end (edge) or the trailing end (edge) of the recording material P, and only the protective agent Z in a small amount is deposited on the recording material P. For that reason, even if toner of a conspicuous color such as black or the like is deposited on a portion where the protective agent Z is deposited on the recording material P, the paper edge contamination is less conspicuous when the amount of the toner of the conspicuous color is small.

FIG. 7 is a schematic side view of the secondary transfer roller 20 in the state in which the protective agent Z is applied, for illustrating an application region of the protective agent Z on the secondary transfer roller 20 in the application sequence in this embodiment. As shown in FIG. 7, in this embodiment, the application region of the protective agent Z with respect to the widthwise direction (main scan direction, rotational axis direction) is a region including positions corresponding to at least first toner patch array 102 and the second toner patch array 103. Incidentally, the widthwise direction (main scan direction, rotational axis direction) of the secondary transfer roller 20 is a direction along (in this embodiment, a direction substantially parallel to) a direction substantially perpendicular to the movement direction of the surface of the intermediary transfer belt 10. That is, the secondary transfer roller 20 includes a region in which the protective agent Z is applied and a region in which the protective agent Z is not applied with respect to the rotational axis direction, and the region in which the protective agent Z is the region including the positions corresponding to at least the first toner patch array 102 and the second toner patch array 103 with respect to the rotational axis direction. Here, with respect to the widthwise direction of the secondary transfer roller 20, the region including the positions corresponding to the toner patch arrays is a region (including a region inside of which the protective agents are formed) broader than a region in which the toner patches are sufficiently formed. By this, a consumption amount of the protective agent Z can be reduced while suppressing the paper edge contamination with the toner patches. Further, in this embodiment, an application range (corresponding to the period from the time t4 to the time t5) of the protective agent Z with respect to a circumferential direction (sub-scan direction, surface movement direction) of the secondary transfer roller 20 is 51 mm which is a length (peripheral length) corresponding to substantially one-full circumference with respect to the circumferential direction of the secondary transfer roller 20. Incidentally, in this embodiment, the application range of the protective agent Z with respect to the circumferential direction (sub-scan direction, surface movement direction) corresponds to a length, with respect to the surface movement direction of the intermediary transfer belt 10, of a region on the intermediary transfer belt 10 for applying the protective agent Z on the secondary transfer roller 20. In the case where the application range of the protective agent Z with respect to the circumferential direction of the secondary transfer roller 20 is less than the circumferential length of the secondary transfer roller 20, it becomes difficult to obtain an effect by the protective agent Z in a substantially whole area. For that reason, the application range of the protective agent Z with respect to the circumferential direction of the secondary transfer roller 20 may preferably be a length substantially equal to the peripheral length of the secondary transfer roller 20. Thus, in a region including the positions, with respect to the widthwise direction of the secondary transfer roller 20, through which the toner patch arrays pass, by applying the protective agent Z over a substantially full circumference of the surface of the secondary transfer roller 20, the depositing force of the toner of the toner patch on the secondary transfer roller 20 can be reduced.

Returning to FIG. 6, the cleaning operation of the protective agent Z will be described. At a time t9, of the protective agent Z applied onto the secondary transfer roller 20, the cleaning operation for electrostatically removing the protective agent Z which can be electrostatically removed easily from the secondary transfer roller 20 is started (S18). As described above, on the secondary transfer roller 20, the protective agent Z charged to the opposite polarity to the normal charge polarity of the toner is deposited as a part of the protective agent Z (yellow toner) in some cases. In this embodiment, as the protective agent Z, the toner is used.

For that reason, there is a liability that the toner which is easy to be electrostatically removed from the secondary transfer roller 20 causes a phenomenon that the toner is deposited on a back surface (side) of the recording material P when the toner image is secondary-transferred onto the recording material P and thus the back surface of the recording material P is contaminated with the toner (hereinafter, referred to as "paper back contamination") or causes the paper edge contamination. In this embodiment, in order to make the protective agent Z less conspicuous even when the protective agent Z is deposited on the recording material P, as the protective agent Z, the yellow toner high in brightness is used. However, it is unpreferable that the amount of the protective agent Z applied onto the secondary transfer roller 20 is excessively large. This is because there is a possibility that even when the contamination is the paper back contamination or the paper edge contamination with the protective agent Z of the color high in brightness and less conspicuous, when a degree of the contamination is excessively large, the user recognizes the contamination. Further, this is also because there is a liability that even when the influence of the secondary transfer roller 20 on an entire electric resistance is small, the electric resistance in a position with respect to the longitudinal direction where the protective agent Z is deposited locally increases and accuracy of control of the secondary transfer voltage lowers and has the influence on an image quality. Therefore, in this embodiment, the cleaning operation capable of removing the protective agent Z from the secondary transfer roller 20 by an electrostatic force is executed (S18).

The protective agent Z (yellow toner) electrostatically removed from the secondary transfer roller 20 is the protective agent Z electrostatically deposited on the secondary transfer roller 20. As described above, in this embodiment, when the protective agent Z passes through the secondary transfer portion N2, to the secondary transfer roller 20, an application voltage (negative application voltage) of the same polarity as the normal charge polarity of the protective agent Z is applied. For that reason, the protective agent Z charged to the opposite polarity to the normal charge polarity is deposited in the neighborhood of the surface of the secondary transfer roller 20. Further, although in a very small amount, the protective agent Z which is electrically attracted to the protective agent Z charged to the opposite polarity to the normal charge polarity and which is charged to the normal charge polarity is also present on the secondary transfer roller 20. In view of a property of such a protective agent Z electrostatically applied onto the secondary transfer roller 20, in this embodiment, in the cleaning operation, cleaning voltages of a positive polarity and a negative polarity (positive cleaning voltage and negative cleaning voltage) are alternately applied plural times. By this, the protective agents Z which are electrostatically deposited on the secondary transfer roller 20 and which are charged to the positive polarity and the negative polarity are removed from the secondary transfer roller 20, so that the cleaning of the secondary transfer roller 20 is executed. Further, an absolute value of the cleaning voltage may preferably be larger than an absolute value of the application voltage from a viewpoint of cleaning strength. This is because the protective agent Z electrostatically deposited on the secondary transfer roller 20 by application of the application voltage is removed from the secondary transfer roller 20 with reliability by applying the cleaning voltage with the absolute value larger than the absolute value of the application voltage. Further, by alternately applying the positive voltage and the negative voltage repetitively, not only the protective agents Z of the positive polarity and the negative polarity can be electrically removed, but also the protective agents Z can be satisfactorily removed under application of mechanical vibration. In this embodiment, the positive cleaning voltage was +1000 V, and the negative cleaning voltage was −1000 V.

At a time t10, the application of the voltage to the secondary transfer roller 20 and the application of the primary transfer voltage are stopped, so that the cleaning operation is ended. Thereafter, at a time t11, the application of the cleaning voltage and the drive of the main motor are stopped (S19), so that the application sequence is ended. Incidentally, in this embodiment, at the time t11 which is the substantially same time as a time of the stop of the rotation of the main motor, the secondary transfer roller 20 is separated from the intermediary transfer belt 10.

Incidentally, for example, in the case where the calibration is executed subsequently to the application sequence or in the like case, after the end of the application sequence (including the cleaning operation), transition to the calibration may be made or the like.

Thus, by executing the application sequence, even when the secondary transfer roller 20 is in the new article state or in the state close to the new article state, it is possible to suppress the contamination of the secondary transfer roller with the toner patches.

<Depositing Force of Protective Agent Z and Measuring Method of Depositing Force>

The protective agent Z may preferably be such that the "physical depositing force F1 between the surface of the secondary transfer roller 20 and the protective agent Z" is larger than the "physical force F2 between the protective agent Z and the toner". That is, the protective agent Z may preferably be such that the protective agent Z is easily deposited physically on the secondary transfer roller 20 (NBR and epichlorohydrin rubber, which are also referred to as "NBR/hydrin rubber" and is not readily deposited on the toner (external additive such as $SiO_2$ on the surface thereof). In this embodiment, the yellow toner as the protective agent Z satisfies such a depositing force relationship. By this, the protective agent Z can effectively be applied onto the secondary transfer roller 20, and the deposition of the toner on the secondary transfer roller 20 onto which the protective agent Z is effectively applied can be suppressed.

Incidentally, the protective agent Z used in this embodiment is the toner having the surface to which $SiO_2$ as the external additive was externally added. Further, the toner constituting the toner patch and the toner image during the normal image formation is also the toner having the surface to which $SiO_2$ as the external additive was externally added. In this embodiment, the toner having the surface to which $SiO_2$ as the external additive was externally added is also simply referred to as "toner".

The measuring method of the depositing force of the protective agent Z in this embodiment will be described. The depositing force between the protective agent Z and the NBR/hydrin rubber and the depositing force between the protective agent Z and the toner were measured by using a SPM (scanning probe microscope) (Trade name: "Q-Scope 250", manufactured by Quesant Instrument Corp.). The measurement was executed in an operation in a contact made in the following manner. Incidentally, a measuring environment was a temperature of 23° C. and a relative humidity of 50% RH. That is, an "$SiO_2$-NBR/hydrin rubber depositing force F1" and an "$SiO_2$—$SiO_2$ depositing force F2" were measured using the SPM. Specifically, a cantilever was pressed against a measuring object material with a predetermined pressing force, and thereafter, a force necessary to disengage the cantilever from the measuring object material was measured as a driving force F between the protective agent Z and the measuring object material. The measuring object material is the NBR/hydrin rubber (corresponding to the surface of the secondary transfer roller or $SiO_2$ (corresponding to the external additive on the surface of the toner). Further, the depositing F in the case where the measuring object material is the NBR/hydrin rubber is the "$SiO_2$-NBR/hydrin rubber depositing force F1". Further, the depositing force in the case where the measuring object material is the $SiO_2$ is the "$SiO_2$—$SiO_2$ depositing force F2". As the cantilever, a round-tipped cantilever of which surface is coated with a silicon oxide film and which is formed of silicon in a tip diameter of 100 nm was used. Thus, a material of the surface of the cantilever was $SiO_2$ which is the same as a principal external additive externally added to the toner surface, and the tip diameter of the cantilever was 100 nm close to a number-average particle size. By this, the depositing force between the external additive on the toner surface and an associated member (measuring object material) can be reproduced with accuracy.

FIG. 8 is a graph showing a measurement result of the depositing forces F1 and F2 in this embodiment. In FIG. 8, the abscissa represents the pressing force of the cantilever, and the ordinate represents the depositing force. As shown in FIG. 8, in this embodiment, irrespective of the pressing force of the cantilever, a relationship between the depositing forces F1 and F2 is F1>F2, and thus satisfies a relationship of "depositing force F1 between the protective agent Z (toner) and the surface of the secondary transfer roller 20">"depositing force F2 between the protective agent Z (toner) and the toner". Accordingly, in this embodiment, the protective agent Z satisfying this relationship can be applied onto the secondary transfer roller 20.

In this embodiment, irrespective of the pressing force of the cantilever, the relationship between the depositing forces F1 and F2 is F1>F2. However, depending on the materials of the secondary transfer roller 20, the protective agent Z, and the principal external additive externally added to the surface of the toner, the magnitude relationship between the depositing forces F1 and F2 is changed by the pressing force of the cantilever in some cases. For that reason, in the case where the magnitude relationship between the depositing forces F1 and F2 is compared, it is preferable that the comparison is made using the depositing forces F1 and F2 when the pressing force of the cantilever (the abscissa of FIG. 8) is a pressing force actually received per one particle of the external additive in the secondary transfer nip N2 (contact portion between the secondary transfer roller 20 and the intermediary transfer belt 10).

As an example, a pressing force F1' received per one particle of the external additive externally added to the surface of the protective agent Z (toner) in the secondary transfer nip N2 in this embodiment is calculated. The pressing force F1' can be calculated by the following formula (1):

$$F1' = (\text{pressing force exerted on secondary transfer nip } N2)/(\text{number of external additive particles existing in secondary transfer nip } N2) \quad (1).$$

Assuming that the toner particles are closest-packed and that the toner surface is uniformly coated with the external additive, the "number of external additive particles existing in secondary transfer nip N2" can be calculated by the following formula (2):

$$(\text{number of external additive particles existing in secondary transfer nip } N2) = (\text{contact portion area of secondary transfer nip } N2)/(\text{cross-sectional area of external additive particles per one particle}) \times (\text{closest packing ratio}) \quad (2).$$

In this embodiment, the pressing force of the secondary transfer roller 20 against the intermediary transfer belt 10 is 50 N. A length of the secondary transfer roller 20 in the rotational axis direction is 216 mm, and a width of the secondary transfer nip N2 with respect to the surface movement direction of the secondary transfer roller 20 is 4 mm. For that reason, a contact area of the secondary transfer nip N2 is 864 $mm^2$. In this embodiment, the number-average particle size of the external additive is 100 nm, and therefore, the cross-sectional area of the external additive particles per one particle is $\pi \times 10^{-14}$ $m^2$. The pressing force received per one particle of the external additive on the secondary transfer roller 20 and the protective agent Z in the secondary transfer nip N2 was 20.8 (nN). Incidentally, in this case, $\pi/\sqrt{12} \approx 0.9069$ which is a closest packing ratio of a two-dimensional circle was used.

From FIG. 8, also in the case where the pressing force (abscissa) is about 20.8 (nN), the relationship between the depositing forces F1 and F2 is F1>F2, so that it is understood that the relationship of: (depositing force F1 between secondary transfer roller 20 and protective agent Z)>(depositing force F2 between protective agent Z (toner) and toner) is satisfied.

6. Effect

In order to confirm an effect of this embodiment, the following test was conducted for the constitution of this embodiment (embodiment 1) and constitutions of comparison examples 1 and 2. In a normal temperature/normal humidity environment (temperature: 23° C./relative humidity: 50% RH), the calibration (color misregistration adjustment) was executed, and then a sheet passing test was conducted using, as the recording material P, papers (tradename: "XEROX Business 4200 Paper", letter size, manufactured by Xerox Corp.), and then presence or absence of an image defect was verified.

Embodiment 1

Application sequence was performed, and during calibration, the secondary transfer roller was contacted to the intermediary transfer belt and a negative voltage was applied to the secondary transfer roller.

Comparison Example 1

Application sequence was not performed, and during calibration, the secondary transfer roller was contacted to the intermediary transfer belt and a negative voltage was applied to the intermediary transfer belt.

Comparison Example 2

Application sequence was not performed, and during calibration, the secondary transfer was separated from the intermediary transfer belt.

Here, the state in which the secondary transfer roller 20 is contacted to the intermediary transfer belt 10 is the state shown in parts (a) and (b) of FIG. 3, and the state in which the secondary transfer roller 20 is detected from the intermediary transfer belt 10 is the state shown in parts (c) and (d) of FIG. 3.

Incidentally, the constitutions and the operations of the image forming apparatuses 100 of the comparison examples 1 and 2 are substantially the same as the constitution and the operation of the image forming apparatus 100 of this embodiment (embodiment 1) except for the above-described points. Further, in each of this embodiment and the comparison examples 1 and 2, the test was conducted using a new secondary transfer roller 20. Further, in this embodiment, the application sequence was executed before the execution (immediately before the execution) of the calibration.

In a table 1 below, an evaluation result of calibration accuracy and the paper edge contamination due to the contamination of the secondary transfer roller 20 is shown. As regards the calibration accuracy, the case where a color misregistration amount after the calibration falls within less than 50 μm was evaluated as "OK", and the case where the color misregistration amount is 50 μm or more was evaluated as "NG".

Further, as regards the paper edge contamination due to the contamination of the secondary transfer roller 20, the case where the paper edge contamination did not substantially occur was evaluated as "OK", and the case where the paper edge contamination occurred to a visually recognizable level was evaluated as "NG".

TABLE 1

| | CA*[1] | STRC*[2] |
|---|---|---|
| EMB. 1 | OK | OK |
| COMP.EX. 1 | OK | NG |
| COMP.EX. 2 | NG | OK |

*1CA is the calibration accuracy.
*2STRC is the secondary transfer roller contamination (paper edge contamination).

In the constitution of the comparison example 1, the secondary transfer roller 20 was contacted to the intermediary transfer belt 10 and the calibration was executed under the same condition as the condition during the image formation, and therefore, there was no problem for the calibration accuracy. However, the toner patches of the respective colors including black are deposited on the secondary transfer roller 20, and therefore, the paper edge contamination such that the leading end (edge) portion of the recording material P is contaminated with the toner of conspicuous color including black by impact when the recording material P enters the secondary transfer portion N2 occurred.

In the constitution of the comparison example 2, the calibration was executed in the state in which the secondary transfer roller 20 was separated from the intermediary transfer belt 10, and therefore, the secondary transfer roller 20 was not contaminated with the toner patches. However, when the secondary transfer roller 20 was separated from the intermediary transfer belt 10 during the calibration, a driving torque was changed from the driving torque during the image formation, so that the calibration accuracy could not be maintained.

On the other hand, in this embodiment, the application sequence was executed before the execution of the calibration, and the protective agent Z was applied onto the secondary transfer roller 20. For that reason, by putting the secondary transfer roller 20 in the contact state with the intermediary transfer belt 10, it was possible to suppress the contamination of the secondary transfer roller 20 with the toner patches while maintaining the calibration accuracy.

Incidentally, during the calibration, the secondary transfer roller 20 was kept in contact with the intermediary transfer belt 10, so that an effect of reducing downtime can also be obtained by reducing a time with the contact and separation operation.

As described above, according to this embodiment, even in the new article state of the secondary transfer roller 20 or in the state close to the new article state, it is possible to suppress the contamination of the secondary transfer roller 20 with the toner patches by executing the application sequence.

7. Modified Embodiment

In this embodiment, as the protective agent Z, the yellow toner was used, but the present invention is not limited thereto. As the protective agent Z, substantially colorless particles or substantially colorless and transparent particles which are further less conspicuous than the yellow toner may be used. For example, transparent toner can be used as the protective agent Z. Further, for example, silicone resin fine particles ("TOSPEARL") used for protecting the surface of the developing roller 41 or the like can be used as the protective agent Z. Further, for example, a metal soap such as zinc stearate used for reducing a frictional force between the cleaning blade 55 and the photosensitive drum 1 or between the belt cleaning blade 91 and the intermediary transfer belt 10 can be used as the protective agent Z. Incidentally, as the metal soap, compounds between fatty acids such as stearic acid, lauric acid, ricinoleic acid, and octylic acid and metals such as lithium, magnesium, calcium, barium, and zinc have been known. The metal soap is a powder (fine powder) which is white, pale yellow or colorless microscopically in many cases, and can be substantially uniformly coated. As the metal soap, in addition to the above-described zinc stearate, it is possible to cite lithium stearate, magnesium stearate, calcium stearate, barium stearate, calcium laurate, barium laurate, zinc laurate, calcium ricinoleate, barium ricinoleate, zinc ricinoleate, zinc octoate, and the like. Parts (a) and (b) of FIG. 9 are schematic views showing a constitution including, as an example of a supplying means for supplying the protective agent Z applied onto the secondary transfer roller 20, a supplying member (application device) for supplying the metal soap 8 to the contact portion between the cleaning blade 55 and the photosensitive drum 1 by applying a metal soap 8 onto the photosensitive drum 1. As shown in part (a) of FIG. 9, in this constitution, brush fibers of a brush roller 6 as the supplying member are impregnated with the metal soap 8, and the brush roller 6 is contacted to the photosensitive drum 1 by a supplying member contact and separation mechanism 7, so that the metal soap 8 (1 μm or less in particle size) is supplied to the surface of the photosensitive drum 1. This metal soap 8 can be used as the protective agent Z. That is, a part of the metal soap 8 deposited on the photosensitive drum 1 passes through the contact portion between the cleaning blade 55 and the photosensitive drum 1 and is applied onto the surface of the photosensitive drum 1. The metal soap 8 applied onto the surface of the photosensitive drum 1 can be supplied to the secondary transfer roller 20 via the intermediary transfer belt 10. Therefore, when the application sequence is started, the brush roller 6 is contacted to the photosensitive drum 1 by the supplying member contact and separation mechanism 7, so that the protective agent Z (metal soap 8) is applied onto the secondary transfer roller 20 via the photosensitive drum 1 and the intermediary transfer belt 10 as described above. Further, in a period other than during the execution of the application sequence, as shown in part (b) of FIG. 9, the brush roller 6 can be separated from the photosensitive drum 1 by the supplying member contact and separation mechanism 7. Incidentally, the supplying member is not limited to the form of the brush roller. The supplying member may also be a solid roller, a sponge roller, or the like. Further, the supplying member is not limited to a constitution in which the supplying member is provided in the image forming portion S in which the protective agent Z (metal soap) is applied onto the secondary transfer roller 20. For example, a constitution in which the protective agent Z (metal soap) is applied onto the secondary transfer roller 20 via the intermediary transfer belt 10 by directly applying the protective agent Z (metal soap) onto the intermediary transfer belt 10 may be employed. Or, a constitution in which the protective agent Z (metal soap) is directly applied onto the secondary transfer roller 20 may be employed.

Here, a neutral protective agent Z such as zinc stearate which is not readily charged is applied onto the secondary transfer roller 20 principally by physical contact, so that different from this embodiment, there is no need to apply the application voltage to the secondary transfer roller 20 when the protective agent Z is applied onto the protective agent Z. Accordingly, there is also no need to perform the cleaning operation (S18 of FIG. 5) for removing, from the secondary transfer roller 20, the protective agent Z which is easily removed electrostatically. For that reason, reduction in down time can be expected. Incidentally, according to study by the present inventors, depositing forces F1-1 and F2-1 of the protective agent Z comprising the metal soap satisfies a relationship of: (depositing force F1-1 between protective agent Z and surface of secondary transfer roller 20)>(depositing force F2-1 between protective agent Z and toner). FIG. 15 is a graph schematically showing the depositing forces F1 and F2 of the protective agent Z comprising the toner and the depositing forces F1-1 and F2-1 of the protective agent Z comprising the metal soap in a comparison manner. It would be considered in many cases that the protective agent Z comprising the metal soap shows the depositing forces F1-1 and F2-1 as shown in FIG. 15. It would be considered that this is also true for the above-described silicone resin fine particles.

Further, in this embodiment, the toner image for application which is a solid image is formed with the yellow toner as the protective agent Z and the protective agent Z is applied onto the secondary transfer roller 20, but the present invention is not limited to such a constitution. The contamination of the secondary transfer roller 20 with the toner may only be required to be suppressed. For example, as shown in FIG. 10, a toner image for application which is a half-tone image is formed with toner as the protective agent Z, and the protective agent Z may be applied onto the secondary transfer roller 20. Incidentally, the half-tone image can be an image of, for example 20% to 80%, typically 50% in density in the case where the density of the solid image is 100%. In this case, a consumption amount of the protective agent Z can be reduced, and it is possible to suppress that the protective agent Z is deposited on the secondary transfer roller 20 more than necessary. For that reason, a time of the cleaning operation (S18 of FIG. 5) is shortened, so that the downtime due to the application sequence can be reduced.

Further, in this embodiment, the application range of the protective agent Z with respect to the circumferential direction of the secondary transfer roller 20 was the length (peripheral length) corresponding to substantially one-full circumference with respect to the circumferential direction of the secondary transfer roller 20, but the present invention is not limited to such a constitution. The contamination of the secondary transfer roller 20 with the toner may only be required to be suppressed. For example, in the case where the application range of the protective agent Z is insufficient when the range corresponds to the peripheral length of the secondary transfer roller 20 or in the like case, the application range of the protective agent Z with respect to the peripheral direction may be longer than the peripheral length of the secondary transfer roller 20. At this time, the application length of the protective agent Z with respect to the circumferential direction of the secondary transfer roller 20 may preferably be a length of substantially N times (N: integer of 1 or more) the peripheral length of the secondary transfer roller 20 so as to suppress application non-uniformity of the protective agent Z with respect to the circumferential direction of the secondary transfer roller 20. Although the present invention is not limited thereto, N is sufficient in many cases when N is 10 or less. Incidentally, in this case, the cleaning operation (S18 of FIG. 15) may be omitted, and in that case, the down time can be reduced.

Thus, in this embodiment, the image forming apparatus 100 includes the image bearing member (intermediary transfer belt) 10, the transfer member (secondary transfer roller) 20 for forming the transfer portion N2 in which the toner image is transferred from the image bearing member 10 onto the recording material P in contact with the surface of the intermediary transfer belt 10, the supplying means (image forming portion) S for supplying the protective agent Z applied onto the surface of the transfer member 20, and the controller 210 capable of controlling the supplying means S, and the controller 210 is capable of executing the operation in the application mode in which during the non-image formation other than during the image formation in which the toner image is transferred from the image bearing member 10 onto the recording material P, the protective agent Z supplied by the supplying means is applied onto the surface of the transfer portion 20 in the state in which the transfer member 20 is contacted to the image bearing member 10. In this embodiment, the image forming apparatus 100 includes the applying means 21 for applying the voltage to the transfer portion N2, and the controller 210 carries out control so that the voltage is applied to the transfer portion N2 during the operation in the application mode. Further, in this embodiment, the applying means 21 applies the voltage to the transfer portion N2 by applying the voltage to the transfer member 20, and the controller 210 carries out control so that during the operation in the application mode, the voltage of the same polarity as the normal charge polarity of the protective agent Z is applied to the transfer member 20.

In this embodiment, the image forming apparatus 100 includes the moving means 23 for moving the transfer member 20 to a first position where the transfer member 20 is pressed against the image bearing member 10 and a second position where the transfer member 20 is retracted from the image bearing member 10, and the controller 210 executes the operation in the application mode so that in a state in which the protective agent Z is supplied to the surface of the image bearing member 10 by the supplying means and the transfer member 20 is in the first position, the protective agent Z supplied to the surface of the image bearing member 10 is applied onto the surface of the transfer member 20 in the transfer portion N2. Incidentally, in this embodiment, the above-described first position is the substantially same position as the position during the image formation. Further, in this embodiment, the above-described second position is the separated position where the transfer member 20 is separated from the image bearing member 10, but the second position may be, for example, a position where the transfer member 20 contacts the image bearing member 10 with a pressure smaller than a pressure in the first position. Particularly, in this embodiment, the image forming apparatus 100 includes the applying means 21 and the moving means, and the controller 210 executes the operation in the application mode so that the protective agent Z supplied to the surface of the image bearing member 10 is applied onto the surface of the transfer member 20 in the transfer portion N2 in a state in which the protective agent Z is supplied to the surface of the image bearing member 10 by the supplying means and the transfer member 20 is in the above-described first position and in which an electric field for electrically urging at least a part of the protective agent Z in a direction from the transfer member 20 toward the image bearing member 10 under application of the voltage to the transfer portion N2 by the applying means 21. In this embodiment, the applying means 21 forms the above-described electric field by applying the voltage of the same polarity as the normal charge polarity of the protective agent Z to the transfer member 20. Further, in this embodiment, the controller 210 executes the operation in the application mode so that an electric field for electrically urging at least a part of the protective agent Z applied to the transfer member 20 in a direction from the transfer member 20 toward the image bearing member 10 is formed under application of the voltage to the transfer member N2 by the applying means 21 after the protective agent Z is applied onto the transfer member 20. In this embodiment, the applying means 21 forms the above-described electric field by applying, to the transfer member 20, the voltage of the same polarity as the normal charge polarity of the protective agent Z (and further the voltage of the opposite polarity to the normal charge polarity of the protective agent Z). Incidentally, the image forming apparatus 100 may have a constitution in which the supplying means directly applies the protective agent Z onto the surface of the transfer member 20.

Further, the image forming apparatus 100 is capable of executing the operation in the application mode so that the protective agent Z is applied onto the surface of the transfer member 20 in a region including at least a position corresponding to the toner image for application formed on the surface of the image bearing member 10 with respect to the widthwise direction of the transfer member 20 along a direction substantially perpendicular to the movement direction of the surface of the image bearing member 10. Further, the controller 210 is capable of executing the operation in the application mode so that the protective agent Z is applied onto the surface of the transfer member 20 over a length of substantially N times (N: positive integer of 1 or more) the peripheral length of the surface of the transfer member 20 which is a rotatable member. Further, the controller 20 is capable of executing the operation in the application mode depending on a signal inputted on the basis of an operation by the operator. Further, the controller 210 is capable of executing the operation in the application mode before the execution of the operation in an adjusting mode (calibration) in which the toner image for application is formed on the surface of the image bearing member and then passes through the transfer portion N2 in the state in which the transfer member 20 contacts the image bearing member 10. Further, the controller 210 is capable of executing the operation in the application mode before the above-described operation in the adjusting mode until a predetermined number time from a start of use of a new transfer member 20. Further, in the case where the transfer member 20 is exchanged to a new article (new transfer member), the controller 210 executes the operation in the application mode before a first toner image is transferred from the image bearing member 10 onto the recording material P by using the transfer member 20.

Here, in this embodiment, when the physical depositing force between the surface of the transfer member 20 and the protective agent Z is F1 and the physical depositing force between the protective agent Z and the toner is F2, the protective agent Z satisfies F1>F2. In this embodiment, the protective agent Z is the toner. Particularly, in this embodiment, the protective agent Z is the yellow toner. Further, in this embodiment, the above-described image bearing member 20 is the intermediary transfer member for conveying the toner image transferred from another image bearing member (photosensitive member) 1, in order to transfer the toner image onto the recording material P in the transfer portion N2. The image forming apparatus 100 includes the plurality of image forming portions S for forming the toner images on the above-described another image bearing member 1 with toners of colors different from each other. The controller 210 executes the operation in the application mode so that of the plurality of image forming portions S, by the image forming portion S for forming the image with the yellow toner, the toner image is formed with the yellow toner on the intermediary transfer member 10 and the toner of the toner image is applied as the protective agent Z onto the surface of the transfer member in the transfer portion N2. Incidentally, the protective agent Z may be the silicone resin fine particles. Further, the protective agent Z may also be the metal soap.

Embodiment 2

Next, another embodiment of the present invention will be described. Basic constitution and operation of an image forming apparatus of this embodiment are the same as those of the image forming apparatus of the embodiment 1. Accordingly, in the image forming apparatus of this embodiment, as regards elements having the same or corresponding functions and constitutions as those in the image forming apparatus of the embodiment 1, reference numerals or symbols which are the same as those in the embodiment 1 are added and detailed description thereof will be omitted.

In this embodiment, the application region of the protective agent Z with respect to the widthwise direction of the secondary transfer roller 20 is a region including a non-sheet-passing portion in the case where at least a minimum-size recording material P usable in the image forming apparatus 100 is used. In the following, description will be made further specifically.

In this embodiment, similarly as in the embodiment 1, yellow toner of about 5 to 10 μm in particle size is used as the protective agent Z. In the image forming portion Sa for yellow, the toner image for application is formed, so that the protective agent Z is supplied to the secondary transfer roller 20.

FIG. 11 is a schematic side view of the secondary transfer roller 20 in the state in which the protective agent Z is applied, for illustrating the application region of the protective agent Z on the secondary transfer roller 20 in the application sequence in this embodiment. In this embodiment, the application region of the protective agent Z with respect to the widthwise direction of the secondary transfer roller 20 is the region including the non-sheet-passing portion in the case where at least the minimum-size recording material P usable in the image forming apparatus 100 is used. That is, the secondary transfer roller 20 includes an application region of the protective agent Z and a non-application region of the protective agent Z with respect to the rotational axis direction thereof. The application region is the region including the non-sheet-passing portion in the case where at least the minimum-size recording material P usable in the image forming apparatus 100 is used. Here, the region including the non-sheet-passing portion in the case where the minimum-size recording material P with respect to the widthwise direction of the secondary transfer roller 20 is used in a region sufficiently including a substantially whole area of the non-sheet-passing portion other than a sheet-passing portion (minimum sheet size width) even when a fluctuation in sheet-passing portion of the minimum-size recording material P is taken into consideration. Similarly as in the embodiment 1, this region includes the positions of the first toner patch array 102 and the second toner patch array 103. Further, in this embodiment, similarly as in the embodiment 1, the application range of the protective agent Z with respect to the circumferential direction of the secondary transfer roller 20 is 51 mm which is a length (peripheral length) corresponding to the substantially one-full circumference of the secondary transfer roller 20 with respect to the circumferential direction.

By this, it is possible to suppress the contamination of the secondary transfer roller 20 with toner other than the toner patches. Specifically, when the image is formed on small-size paper, such as A4-size paper or a postcard, which is narrow in width with respect to the rotational axis direction of the secondary transfer roller 20, fog toner from the developing roller 41 is deposited on the non-sheet-passing portion of the secondary transfer roller 20. Although fog toner on the sheet-passing portion is discharged as paper fog together with the recording material P, the fog toner on the non-sheet-passing portion is accumulated on the secondary transfer roller 20 during printing. As a result, after the image is formed on small-size paper, when the image is formed on large-size paper, for example LTR-size paper large in width with respect to the rotational axis direction of the secondary transfer roller 20, paper edge contamination or back surface contamination is caused by the fog toner accumulated on the secondary transfer roller 20. On the other hand, in this embodiment, roughly the protective agent Z is applied onto the substantially whole area of the secondary transfer roller 20 excluding the sheet-passing portion of the small-size paper, so that it is possible to suppress that the fog toner is deposited and accumulated on the secondary transfer roller 20 when the image is formed on the small-size paper.

Incidentally, in this embodiment, although the protective agent Z is applied onto the region including the non-sheet-passing portion of at least the minimum-size recording material P, the present invention is not limited to such a constitution. The protective agent Z can be applied onto a region including the non-sheet-passing portion in the case where an arbitrary-size recording material P usable in the image forming apparatus 100 is used. The operator such as the user may be constituted so as to be capable of changing (selecting) the application region of the protective agent Z with respect to the widthwise direction of the secondary transfer roller 20 from the operating portion 206 or a host computer. For example, in the case where a first recording material P with a first width as a width with respect to the widthwise direction of the secondary transfer roller 20 and a second recording material P with a second width wider than the first width are principally used, the protective agent Z may only be required to be applied onto the region including the non-sheet-passing portion. Further, as shown in FIG. 12, the protective agent Z may also be applied onto a substantially whole area of the secondary transfer roller 20 with respect to the widthwise direction and the circumferential direction. For example, in the case of a constitution in which the developing roller 41 is always contacted to the photosensitive drum 1 there is a possibility that the substantially whole area of the secondary transfer roller 20 is contaminated with the fog toner in the sheet interval or the like. For that reason, by applying the protective agent Z onto the secondary transfer roller 20 in the substantially whole area with respect to the widthwise direction and the circumferential direction, such a contamination can be suppressed.

Thus, the controller 210 is capable of executing the operation in the application mode so that the protective agent Z is applied onto the surface of the transfer member 20 in a region including a region through which a recording material P (typically, a minimum-size recording material P usable in the image forming apparatus 100) with at least a predetermined size with respect to the widthwise direction of the transfer member 20 along a direction substantially perpendicular to the surface movement direction of the image bearing member 10 does not pass when the toner image is transferred from the image bearing member 10 onto the recording material P. Further, the controller 210 is capable of executing the operation in the application mode so as to apply the protective agent Z onto the surface of the transfer member 20 in the substantially whole area with respect to the widthwise direction of the transfer member 20 along the direction substantially perpendicular to the surface movement direction of the image bearing member 10.

As described above, according to this embodiment, it becomes possible to suppress the contamination of the secondary transfer roller 20 with the toner patches or the fog toner in the non-sheet-passing portion when the image is formed on the small-size paper.

Embodiment 3

Next, another embodiment of the present invention will be described. Basic constitution and operation of an image forming apparatus of this embodiment are the same as those of the image forming apparatus of the embodiment 1. Accordingly, in the image forming apparatus of this embodiment, as regards elements having the same or corresponding functions and constitutions as those in the image forming apparatus of the embodiment 1, reference numerals or symbols which are the same as those in the embodiment 1 are added and detailed description thereof will be omitted.

1. Constitution and Effect of this Embodiment

In this embodiment, the case where an intermediary transfer belt 10 constituted by a low-resistant belt low in electric resistance value to the extent that a current is capable of being passed through the belt in the circumferential direction will be described. That is, in this embodiment, an intermediary transfer member is constituted by an endless belt having an electric resistance value at which the current can be passed through the belt in the circumferential direction.

FIG. 13 is a schematic sectional view of the intermediary transfer belt 10 in this embodiment. The intermediary transfer belt 10 in this embodiment is an endless belt of 700 mm in peripheral length and 65 μm in thickness. Further, as shown in FIG. 13, the intermediary transfer belt 10 in this embodiment has a two-layer structure consisting of a base layer 10*e* of 64 μm in thickness and an inner surface layer 10*f* of 1 μm in thickness. The intermediary transfer belt 10 contacts the photosensitive drum 1 on a base layer 10*e* side (outer peripheral surface side) and contacts the primary transfer member 14 on an inner surface layer 10*f* side (inner peripheral surface side).

In this embodiment, as a material of the base layer 10*e*, a polyethylene terephthalate (PET) resin material in which an ion-conductive agent is mixed as an electroconductive agent was used. Further, in this embodiment, as a material of the inner surface layer 10*f*, a polyester resin material in which carbon black which is an electron-conductive agent as the electroconductive agent is mixed was used. The inner surface layer 10*f* is formed on the inner peripheral surface side of the laser layer 10*e*, and contacts first, second, and third stretching rollers 11, 12, and 13. Incidentally, in this embodiment, the first stretching roller 11 functions as a driving roller, the second stretching roller 12 functions as a tension roller, and the third stretching roller 13 functions as a secondary transfer opposite roller. In this embodiment, as the material of the base layer 10*e*, the polyethylene terephthalate (PET) resin material was used, but another material can also be used. For example, materials such as polyester and acrylonitrile-butadiene-styrene (ABS) copolymer, a mixed resin material of these materials, and the like may be used. Further, in this embodiment, as the material of the inner surface layer 10*f*, the polyester resin material was used, but another material may also be used. For example, an acrylic resin material may also be used.

In this embodiment, compared with the electric resistance value of the base layer 10*e* of the intermediary transfer belt 10, the electric resistance of the inner surface layer 10*f* is low. In this embodiment, volume resistivity of the intermediary transfer belt 10 is $1\times10^{10}$ Ω·cm. Further, in this embodiment, surface resistivity of the inner peripheral surface of the intermediary transfer belt 10 is $1.0\times10^{6}$ Ω/□. Incidentally, a measuring environment of an electric characteristic of the intermediary transfer belt 10 is an environment ("NN environment") in which a room temperature is 23° C. and a room humidity is 50% RH.

Between the base layer 10*e* and the inner surface layer 10*f*, from a relationship between the electric resistance and the thickness, the electric resistance value of the base layer 10*e* is reflected in volume resistivity actually measured for the intermediary transfer belt 10. On the other hand, the electric resistance value of the inner surface layer 10*f* is reflected in surface resistivity actually measured for the inner peripheral surface of the intermediary transfer belt 10.

Incidentally, the volume resistivity was measured by using a measuring device ("Hiresta-UP (MCP-HI450)", manufactured by Mitsubishi Chemical Holdings Corp.) provided with a ring probe ("Type UR (mode: MCP-HTP12). Further, the surface resistivity was measured using the same device, as the measuring device for the volume resistivity, provided with a ring probe ("Type UR100 (model: MCP-HTP16).

Measurement of the volume resistivity was measured under a condition such that the probe is applied to the intermediary transfer belt 10 from the outer peripheral surface side and a voltage of 100 V is applied for 10 sec as a measuring time. Further, measurement of the surface resistivity was measured under a condition such that the probe is applied from the inner peripheral surface side and a voltage of 10 V is applied for 10 sec as a measuring time.

Here, in this embodiment, the volume resistivity of the intermediary transfer belt 10 may preferably be in a range of $1\times10^{9}$ Ω·cm or more and $1\times10^{10}$ Ω·cm, and the surface resistivity of the inner peripheral surface of the intermediary transfer belt 10 may preferably be in a range of $4.0\times10^{6}$ Ω/□ or less (typically, $1.0\times10^{3}$ Ω/□ or more). As regards the intermediary transfer belt 10 having such an electric characteristic, the electric resistance value is low to the extent that the current is caused to flow through the intermediary transfer belt 10 in the circumferential direction, and therefore, even when the primary transfer voltage is made low (an absolute value is made small), the primary transfer current is caused to sufficiently flow through the photosensitive drum 1, so that the periphery transfer can be satisfactorily carried out. For that reason, it becomes possible to reduce an electric discharge amount in the primary transfer portion N1. As a result, it becomes possible to suppress a generation amount of the electric discharge product, and further, the charge polarity of the toner transferred on the intermediary transfer belt 10 is reversed or the like, so that it becomes possible to suppress retransfer such that the toner is transferred back onto the photosensitive drum 1.

However, in the case where such a low-resistant belt is used as the intermediary transfer belt 10, the current flows through the photosensitive drum 1 during the calibration, so that electric discharge deterioration of the photosensitive drum 1 occurs in some instances. That is, the toner such as the toner patches, which is not transferred onto the recording material P is required to be sent to the belt cleaning device 9 by being passed through the secondary transfer portion N2. For that reason, as described in the embodiment 1, to the secondary transfer roller 20, a predetermined voltage is applied in a state in which there is no recording material P in the secondary transfer portion N2. In the case where the low-resistant belt is used as the intermediary transfer belt 10, at this time, the current flows through the photosensitive drum 1 via the intermediary transfer belt 10, so that the electric discharge deterioration of the photosensitive drum 1 occurs in some cases. When the electric discharge deterioration of the photosensitive drum 1 occurs, an image defect due to improper charging of the photosensitive drum 1 occurs in some cases.

On the other hand, in this embodiment, the image forming apparatus 100 is capable of executing the operation in the application mode preferably at least in a new article state of the secondary transfer roller 20 or in a state close to the new article state (state in which a use history is small), typically before the execution of the calibration. In this embodiment, similarly as in the embodiment 1, in the application sequence, the toner as the protective agent Z high in electric resistance is applied onto the secondary transfer roller 20. This toner is electrically insulative.

Particularly, in this embodiment, as shown in FIG. 12, the protective agent Z is applied onto the secondary transfer roller 20 in the substantially whole area with respect to the widthwise direction and the circumferential direction. Incidentally, the operation, an execution timing, and the like of the application sequence can be made similar to those in the embodiment 1 and the embodiment 2.

Thus, by applying the protective agent Z high in electric resistance onto the secondary transfer roller 20, the electric resistance value of the secondary transfer roller 20 can be increased. For that reason, even in a state in which there is no recording material P in the secondary transfer portion N2 during the calibration, a current amount of the current flowing through the photosensitive drum 1 via the intermediary transfer belt 10 can be made small. As a result, it becomes possible to suppress the electric discharge deterioration of the photosensitive drum 1, so that it is possible to suppress the image defect due to the improper charging or the like. Incidentally, simultaneously at this time, effects similar to the effects of the embodiments 1 and 2 can be also achieved.

Incidentally, the electric discharge deterioration of the photosensitive drum 1 due to the current flowing through the photosensitive drum 1 via the intermediary transfer belt 10 is liable to occur in the case where the secondary transfer roller 20 is in the new article state or in the state close to the new article state. When the secondary transfer roller 20 is continuously used, the fog toner or the like is gradually deposited on the surface of the secondary transfer roller 20 or localization of the electroconductive agent occurs, so that there is a tendency that the electric resistance of the secondary transfer roller 20 becomes high. Therefore, also in this embodiment, preferably at least in the new article state of the secondary transfer roller 20 or in the state close to the new article state, the application sequence is executed. By this, it is possible to suppress the electric discharge deterioration of the photosensitive drum 1 due to the current flowing from the secondary transfer roller 20, particularly in the new article state or in the state close to the new article state, to the photosensitive drum 1 through the intermediary transfer belt 10.

As described above, according to this embodiment, it is possible to suppress the electric discharge deterioration of the photosensitive drum 1 in the case where the low-resistant belt is used, while suppressing the contamination of the secondary transfer roller 20 with the toner patches or the fog toner.

2. Modified Embodiment

As a modified embodiment of the constitution in which as the intermediary transfer belt 10, the low-resistant belt with the low electric resistance value to the extent that the current can be passed through the intermediary transfer belt 10 in the circumferential direction is used, a constitution provided with no primary transfer power source will be described. As an example of the constitution provided with no primary transfer power source, it is possible to cite a drum voltage constitution in which the primary transfer voltage is connected to the ground as shown in FIG. 14. FIG. 14 is a schematic view showing a high-voltage power source and a grounding state in an image forming apparatus 100 of this modified embodiment.

In this modified embodiment, the primary transfer member 14 is connected to the ground (0 V) (electrically grounded), and to the core metal (not shown) of the photosensitive drum 1, a reference voltage (for example, −300 V) is applied from a high-voltage power source 200. Further, on the surface of the photosensitive drum 1, an image portion potential V1 (for example, −400 V) larger in absolute value than the reference voltage is formed. Further, by a difference (primary transfer contrast ΔV) between a potential (0 V) of the primary transfer member 14 and the image portion potential V1, the toner formed on the photosensitive drum 1 is primary-transferred onto the intermediary transfer belt 10. In this modified embodiment, the intermediary transfer belt 10 is constituted by the low-resistant belt which is low in electric resistance to the extent that the current is caused to flow through the intermediary transfer belt 10 in the circumferential direction, and therefore, even when the primary transfer contrast is small, the primary transfer current can be caused to sufficiently flow through the intermediary transfer belt 10. For that reason, as in this modified embodiment, in the drum voltage constitution provided with no primary transfer power source, the intermediary transfer belt 10 constituted by the low-resistant belt as described above may preferably be used.

The constitution and the operation of the image forming apparatus 100 of this modified embodiment are substantially the same as those of the image forming apparatus 100 of this embodiment (embodiment 3) except for the above-described points, and an effect similar to the effect of this embodiment. That is, in this modified embodiment, as the intermediary transfer belt 10, the low-resistant belt is used, and therefore, similarly as this embodiment, the secondary transfer current becomes liable to flow toward the photosensitive drum 1 through the intermediary transfer belt 10. On the other hand, in this modified embodiment, similarly as this embodiment, the protective agent Z high in electric resistance is applied onto the secondary transfer roller 20 in the substantially whole area, and therefore, the electric resistance value of the secondary transfer roller 20 can be increased. For that reason, the electric discharge deterioration can be suppressed. As a result, it is possible to realize a simple constitution provided with no primary transfer power source as in this modified embodiment.

Thus, according to this modified embodiment, while suppressing the contamination of the secondary transfer roller 20 with the toner patches or the fog toner, it is possible to not only suppress the electric discharge deterioration of the photosensitive drum 1 in the case where the low-resistant belt is used but also realize the simple constitution provided with no primary transfer power source.

As described above, the present invention was described based on the specific embodiments, but the present invention is not limited to the above-described embodiments.

In the above-described embodiments, the secondary transfer opposite roller was electrically grounded, and the voltage was applied to the secondary transfer portion by applying the voltage to the secondary transfer roller, so that the electric field was formed in the secondary transfer portion. On the other hand, the voltage is applied to the inner roller corresponding to the secondary transfer opposite roller in the above-described embodiments, and the outer roller corresponding to the secondary transfer roller in the above-described embodiments may be electrically grounded. In this case, to the inner roller, at a timing such as the application sequence (including the cleaning operation) during the image formation, a voltage of the opposite polarity to the polarity of the voltage applied to the secondary transfer roller in the above-described embodiments may only be required to be applied.

Further, in the above-described embodiments, the case where the developing device uses the non-magnetic one-component developer as the developer was described as an example, but the developing device may be a developing device using, as the developer, for example, a magnetic one-component developer or a two-component developer containing toner and a carrier. In either case, to the toner, the external additive similar to those in the above-described embodiments is externally added in many cases. Further, in the above-described embodiments, the developing device carries out development by bringing the developing member into contact with the photosensitive member but may also be a developing device carrying out development in which the developing member is disposed close to the photosensitive member without being contacted to the photosensitive member and in which the developer is caused to fly or may also be a developing device in which the developer carried on the developing member is contacted to the photosensitive member.

Further, in the above-described embodiments, the case where the image forming apparatus is the color image forming apparatus of an in-line type and an intermediary transfer type was described as an example. In such an image forming apparatus, it can be said that the present invention can be particularly preferably applied as a means for suppressing the paper edge contamination due to the calibration while suppressing a lowering in accuracy of the calibration. However, the present invention is not limited to such a constitution. For example, the present invention is applicable to a monochromatic image forming apparatus in which a toner image is directly transferred from the photosensitive member as the image bearing member onto the recording material; for example, a black (monochromatic) image is formed. In this case, the present invention is applicable to a transfer portion which is a contact portion between the photosensitive member and a transfer portion. That is, also, in such a constitution, the transfer member is contaminated with the toner in some instances. For example, the toner patches are formed on the photosensitive member, and then an operation in an adjusting mode, such as density adjustment, is executed in some instances. At this time, for the purpose of reducing the downtime with a contact and separation operation of the transfer member relative to the photosensitive member, a constitution in which the toner patches pass through the transfer portion in a state in which the transfer member contacts the photosensitive member is employed in some cases. For that reason, the transfer member is contaminated with the toner patches in some instances. Further, the transfer member is contaminated with the fog toner in some instances. Further, when the transfer member is contaminated with the toner, the paper edge contamination occurs in some instances. Accordingly, also, in such a constitution, by applying the present invention to such a constitution, it is possible to obtain an effect similar to those in the above-described embodiments.

According to the present invention, it is possible to suppress the contamination of the transfer member, with the toner, for forming the transfer portion where the toner image is transferred from the image bearing member onto the recording material in contact with the image bearing member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-093285 filed on Jun. 8, 2022, which is hereby incorporated by reference herein in its entirety.

What is claimed is:

1. An image forming apparatus comprising:
- an image bearing member configured to bear a toner image formed with toner charged to a normal polarity;
- a transfer member configured to form a transfer portion where the toner image is transferred from the image bearing member onto a recording material in contact with a surface of the image bearing member;
- a transfer voltage applying portion configured to apply a transfer voltage having the same polarity as the normal polarity of the toner to the transfer portion;
- a supplying member configured to supply a protective agent to be applied onto a surface of the transfer member; and
- a controller capable of controlling the transfer voltage applying portion and the supplying member, wherein the controller controls:
- an image forming operation in which the toner image is transferred from the image bearing member onto the recording material,
- an application mode in which the protective agent supplied from the supplying member is applied onto the surface of the transfer member in a state in which the transfer member contacts the image bearing member during a non-image forming operation other than during the image forming operation, and
- a cleaning mode in which the surface of the transfer member is cleaned in a state in which the transfer member contacts the image bearing member during a non-image forming operation, and wherein, in the application mode and the cleaning mode, the controller controls the transfer voltage applying portion to apply the transfer voltage having the same polarity as the normal polarity, and controls an absolute value of the transfer voltage applied in the application mode to be lower than the absolute value of the transfer voltage applied in the cleaning mode.

2. An image forming apparatus according to claim 1, further comprising a moving member configured to move the transfer member to a first position where the transfer member is pressed against the image bearing member and a second position where the transfer member is retracted from the image bearing member, wherein in a state in which the protective agent is supplied to the surface of the image bearing member by the supplying member and the transfer member is in the first position, the controller carries out control so as to execute the operation in the application mode so that the protective agent supplied to the surface of the image bearing member is applied onto the surface of the transfer member in the transfer portion.

3. An image forming apparatus according to claim 2, wherein the controller carries out control so as to execute the operation in the application mode by applying, to the transfer portion by the applying portion after the protective agent is applied onto the transfer member, the transfer voltage such that an electric field for electrically urging at least a part of the protective agent applied onto the transfer member in a direction from the transfer member toward the image bearing member is formed on the transfer portion.

4. An image forming apparatus according to claim 1, further comprising:
- a moving member configured to move the transfer member to a first position where the transfer member is pressed against the image bearing member and a second position where the transfer member is retracted from the image bearing member, wherein in a state in which the protective agent is supplied to the surface of the image bearing member by the supplying member and the transfer member is in the first position and in which an electric field for electrically urging at least a part of the protective agent in a direction from the transfer member toward the image bearing member is formed in the transfer portion by applying the transfer voltage to the transfer portion by the transfer applying portion, the controller carries out control so as to execute the operation in the application mode so that the protective agent supplied to the surface of the image bearing member is applied onto the surface of the transfer member in the transfer portion.

5. An image forming apparatus according to claim 4, wherein the controller carries out control so as to execute the operation in the application mode by applying, to the transfer portion by the applying portion after the protective agent is applied onto the transfer member, the transfer voltage such that an electric field for electrically urging at least a part of the protective agent applied onto the transfer member in a direction from the transfer member toward the image bearing member is formed on the transfer portion.

6. An image forming apparatus according to claim 1, wherein the controller carries out control so as to execute the operation in the application mode so that the protective agent is applied onto the surface of the transfer member in a region including a position corresponding to a test toner image formed on the surface of at least the image bearing member with respect to a widthwise direction of the transfer member along a direction substantially perpendicular to a movement direction of the surface of the image bearing member.

7. An image forming apparatus according to claim 1, wherein the controller carries out control so as to execute the operation in the application mode so that the protective agent is applied onto the surface of the transfer member in a region including a region where, with respect to a widthwise direction of the transfer member along a direction substantially perpendicular to a movement direction of the surface of the image bearing member, the recording material does not pass when the toner image is transferred from the image bearing member onto the recording material with at least a predetermined size.

8. An image forming apparatus according to claim 1, wherein the controller carries out control so as to execute the operation in the application mode so that the protective agent is applied onto a substantially whole region of the surface of the transfer member with respect to a widthwise direction of the transfer member along a direction substantially perpendicular to a movement direction of the surface of the image bearing member.

9. An image forming apparatus according to claim 1, wherein the controller carries out control so as to execute the operation in the application mode so that the protective agent is applied onto the surface of the transfer member over a length which is substantially N times (where N is a positive integer of 1 or more) a peripheral length of the surface of the transfer member, which is a rotatable member.

10. An image forming apparatus according to claim 1, wherein the controller carries out control so as to execute the operation in the application mode depending on a signal inputted on the basis of an operation by an operator.

11. An image forming apparatus according to claim 1, wherein in a case that an operation in an adjusting mode in which a test toner image is formed on the surface of the image bearing member and passes through the transfer portion in a state in which the transfer member contacts the image bearing member, the controller carries out control so as to execute the operation in the application mode before the operation in the adjusting mode is executed.

12. An image forming apparatus according to claim 11, wherein the controller carries out control so as to execute the operation in the application mode before the operation in the adjusting mode from a start of use of a new transfer member until a predetermined number of times of execution of the operation in the adjusting mode.

13. An image forming apparatus according to claim 1, wherein the controller carries out control so as to execute the operation in the application mode before a first toner image is transferred from the image bearing member onto the recording material by using the transfer member in a case that the transfer member is exchanged with a new transfer member.

14. An image forming apparatus according to claim 1, wherein the image bearing member is an intermediary transfer member for conveying the toner image transferred from another image bearing member so as to be transferred onto the recording material in the transfer portion, and wherein the intermediary transfer member is constituted by an endless belt having an electric resistance value at which a current is caused to flow in a circumferential direction.

15. An image forming apparatus according to claim 1, wherein when a physical depositing force between the surface of the transfer member and the surface of the protective agent is defined as F1, and a physical depositing force between the protective agent and toner is defined as F2, the protective agent satisfies: F1>F2.

16. An image forming apparatus according to claim 15, wherein the protective agent is the toner.

17. An image forming apparatus according to claim 16, wherein the protective agent is yellow toner.

18. An image forming apparatus according to claim 17, wherein the image bearing member is an intermediary transfer member for conveying the toner image transferred from another image bearing member so as to be transferred onto the recording material in the transfer portion, wherein the image forming apparatus further comprises a plurality of image forming portions, each including the other image bearing member and each configured to form a toner image on the other image bearing member with toner of an associated one of colors different from each other, and wherein the controller carries out control so as to execute the operation in the application mode so that the toner image is formed with the yellow toner on the intermediary transfer member by the image forming portion, of the plurality of image forming portions, as the supplying member, for forming the toner image with the yellow toner, and the yellow toner of the toner image is applied as the protective agent onto the surface of the transfer member in the transfer portion.

19. An image forming apparatus according to claim 15, wherein the protective agent comprises fine silicone resin particles.

20. An image forming apparatus according to claim 15, wherein the protective agent is a metal soap.

21. An image forming apparatus comprising:

a photosensitive member configured to bear a toner image formed with toner charged to a normal polarity;

an intermediary transfer member onto which the toner image is transferred from the photosensitive member;

a transfer member configured to form a transfer portion where the toner image is transferred from the intermediary transfer member onto a recording material in contact with a surface of the intermediary transfer member;

a transfer voltage applying portion configured to apply a transfer voltage having the same polarity as the normal polarity of the toner to the transfer portion;

a supplying member configured to supply a protective agent to be applied onto a surface of the transfer member; and a controller capable of controlling the transfer voltage applying portion and the supplying member, wherein the controller controls:

an image forming operation in which the toner image is transferred from the image bearing member onto the recording material, an application mode in which the protective agent supplied from the supplying member is applied onto the surface of the transfer member, in a state in which the transfer member contacts the intermediary transfer member during a non-image forming operation other than during the image forming operation, and a cleaning mode in which the surface of the transfer member is cleaned in a state in which the transfer member contacts the intermediary transfer member during a non-image forming operation, and wherein, in the application mode and the cleaning mode, the controller controls the transfer voltage applying portion to apply the transfer voltage having the same polarity as the normal polarity, and controls the absolute value of the transfer voltage applied in the application mode to be lower than the absolute value of the transfer voltage applied in the cleaning mode.

22. An image forming apparatus according to claim 21, wherein the intermediary transfer member is constituted by an endless belt and is stretched by a plurality of stretching rollers, wherein the transfer member forms the transfer portion by being pressed through the intermediary transfer member toward an opposite roller which is one of the stretching rollers, and wherein the controller carries out control so as to execute the operation in the application mode so that the protective agent supplied from the supplying member is applied onto the surface of the transfer member in a state in which the transfer member is pressed through the intermediary transfer member toward the opposite roller.

* * * * *